(12) United States Patent
Baradaran

(10) Patent No.: US 12,211,133 B2
(45) Date of Patent: Jan. 28, 2025

(54) JSON-BASED TRANSLATION OF SOFTWARE PROGRAMMING LANGUAGE INTO AN ACCESSIBLE DRAG AND DROP WEB-BASED APPLICATION FOR CONTENT CREATION IN SPATIAL COMPUTING

(71) Applicant: Amir Baradaran, New York, NY (US)

(72) Inventor: Amir Baradaran, New York, NY (US)

( * ) Notice: Subject to any disclaimer, the term of this patent is extended or adjusted under 35 U.S.C. 154(b) by 33 days.

(21) Appl. No.: 17/748,250

(22) Filed: May 19, 2022

(65) Prior Publication Data
US 2022/0398798 A1 Dec. 15, 2022

Related U.S. Application Data

(60) Provisional application No. 63/190,718, filed on May 19, 2021.

(51) Int. Cl.
*G06T 13/40* (2011.01)
*G06T 15/60* (2006.01)

(52) U.S. Cl.
CPC .............. *G06T 13/40* (2013.01); *G06T 15/60* (2013.01); *G06T 2200/24* (2013.01)

(58) Field of Classification Search
None
See application file for complete search history.

(56) References Cited

U.S. PATENT DOCUMENTS

2022/0172633 A1* 6/2022 Jha .................. G06T 15/00

OTHER PUBLICATIONS

Provisional application of 20220172633 (Year: 2019).*
English Translation of CN 112419457 (Year: 2021).*
https://docs.unity3d.com/2017.4/Documentation/Manual/30_search.html?q=animation+loop (Year: 2017).*

* cited by examiner

*Primary Examiner* — Nurun Flora
(74) *Attorney, Agent, or Firm* — Mark R Kendrick

(57) ABSTRACT

A method of creating an animation file for a virtual reality, augmented reality, extended reality or mixed reality story file on a computing device includes selecting an animation start; selecting a number of loops or repetitions to be performed for the animation file; selecting a rotation at origin and a position of origin for the animation file; selecting a rotation at destination and a position of destination for the animation file; and selecting a body type for the animation file. The method further comprises generating javascript object notation (JSON) parameters for animation file based at least in part on the selected animation start, the selected number of loops or repetition, the rotation at origin; the position at origin; the position of destination; the rotation at destination or the selected body type for the animation file; and storing the generated JSON parameters for the animation file in a database.

21 Claims, 34 Drawing Sheets

C4 Component Diagram
iBEGOO Unity Controller Part 2

C4 Component Diagram
iBEGOO Web Application Part 1

C4 Component Diagram
iBEGOO Web Application Part 2

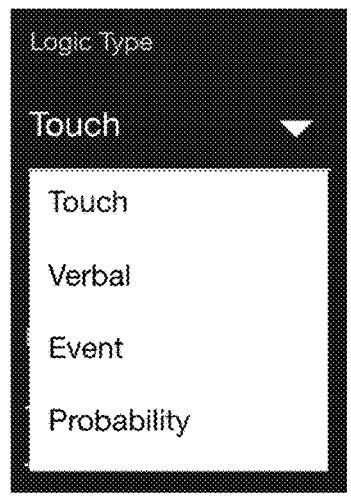
Figure 5.1
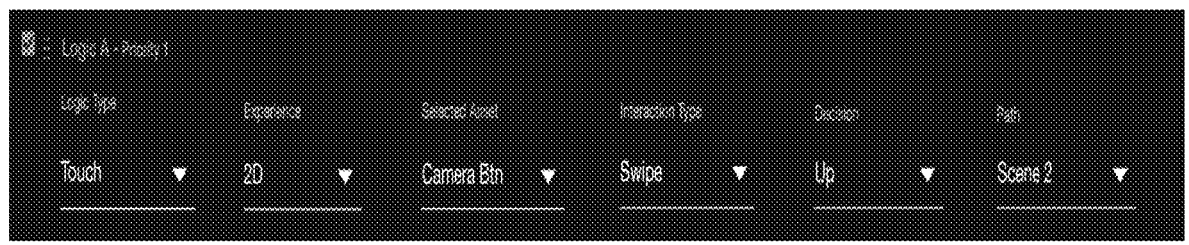
Figure 5.2

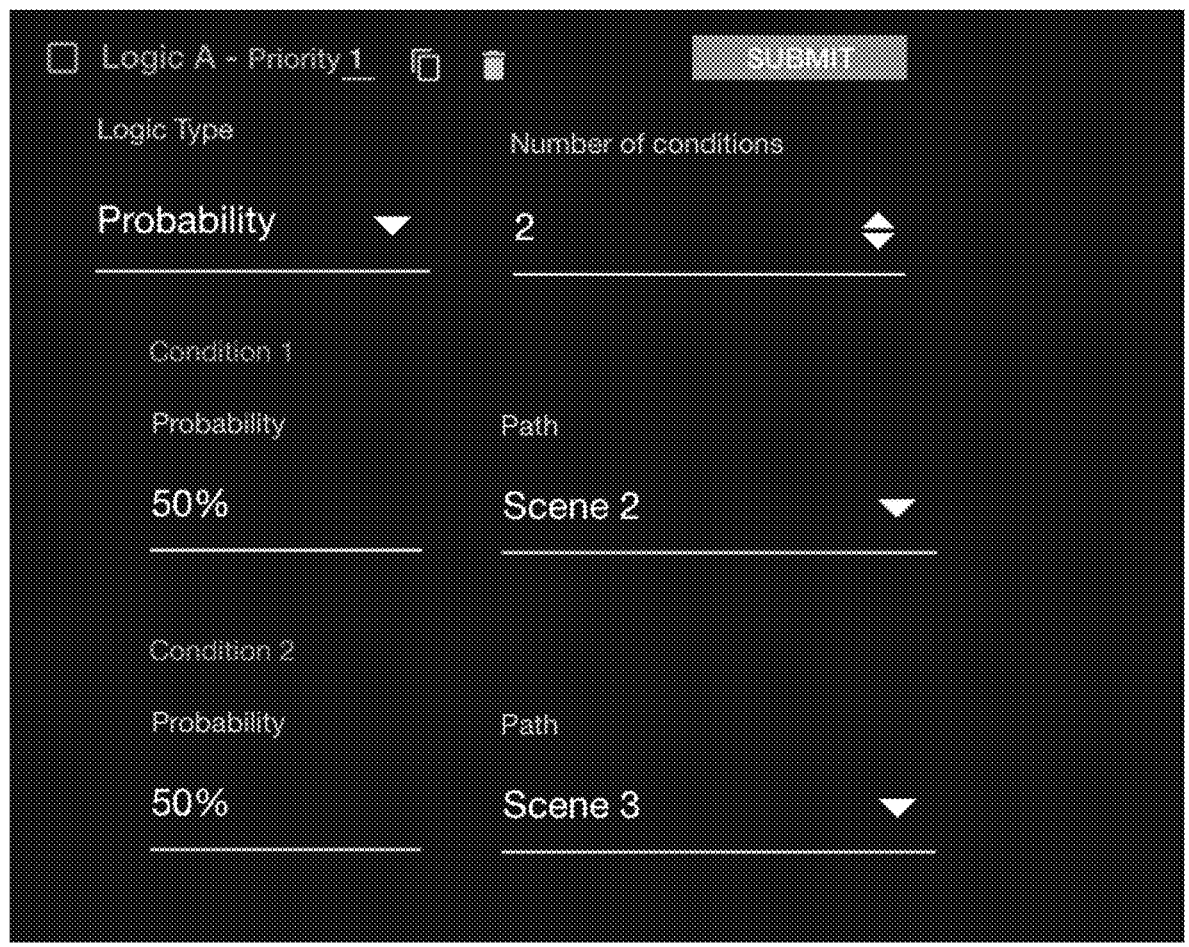
Figure 5.3
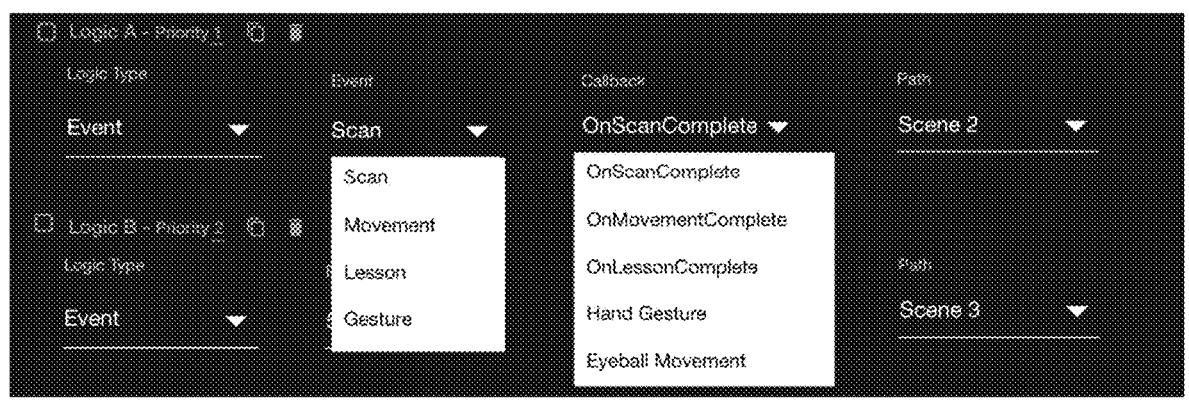
Figure 5.4

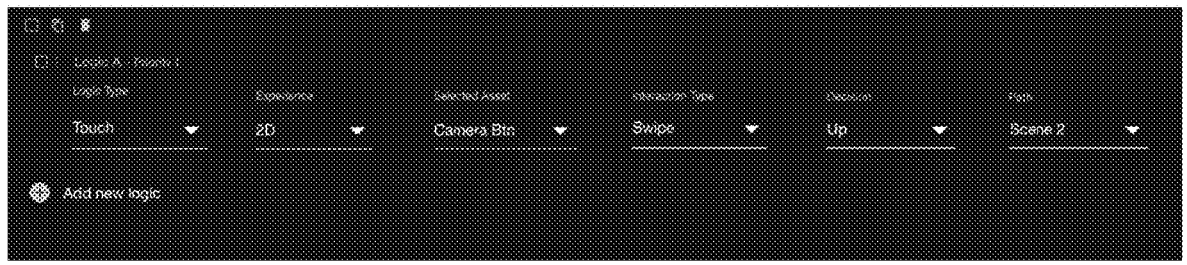
Figure 5.5
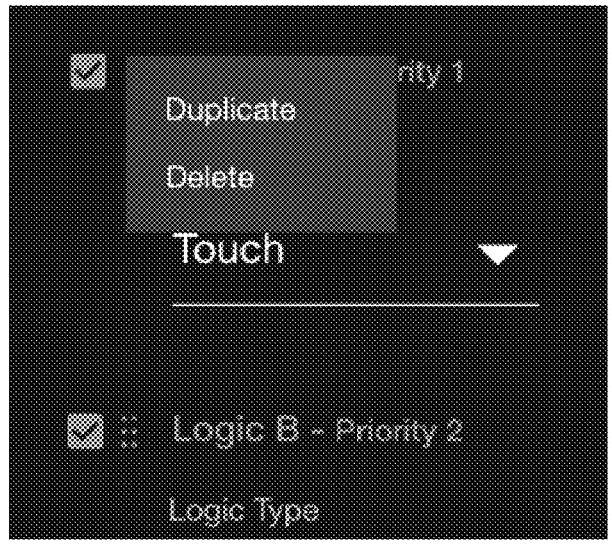
Figure 5.6

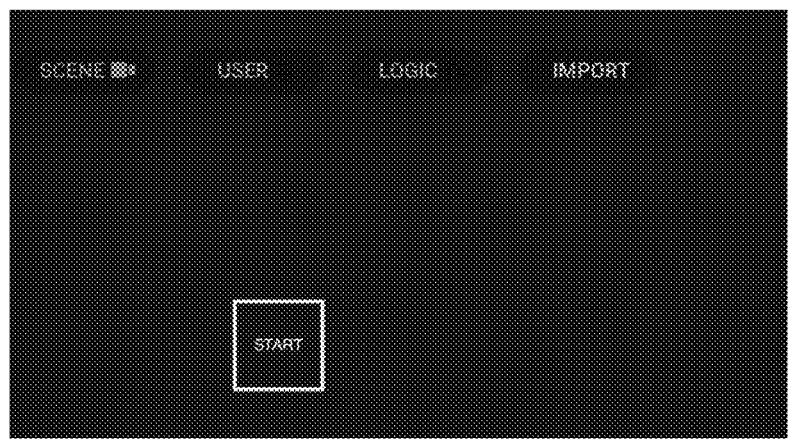
Figure 5.7
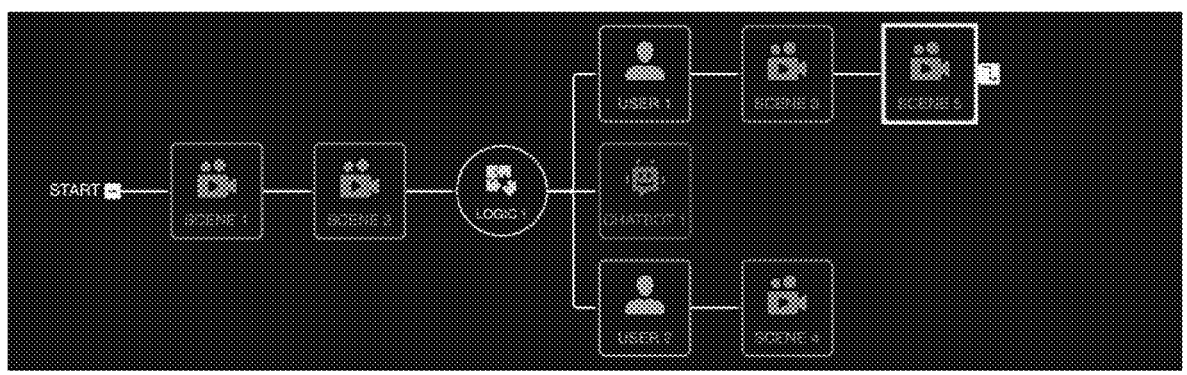
Figure 5.8

Figure 5.9
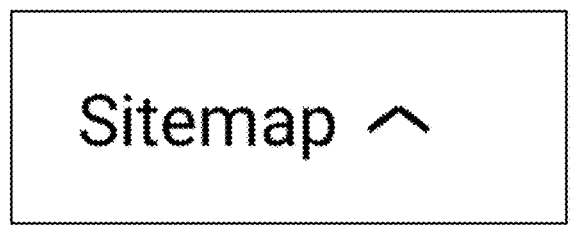
Figure 5.10
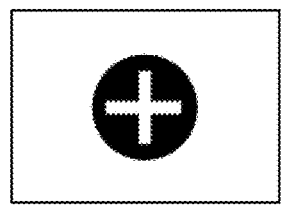
Figure 5.11
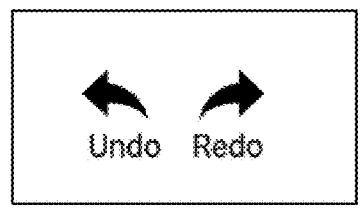
Figure 5.12

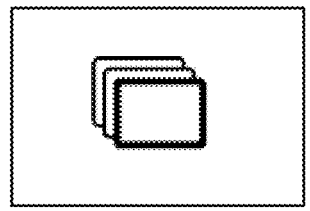
Figure 5.13
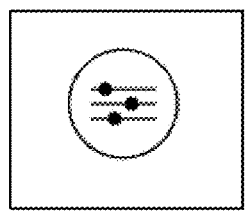
Figure 5.14
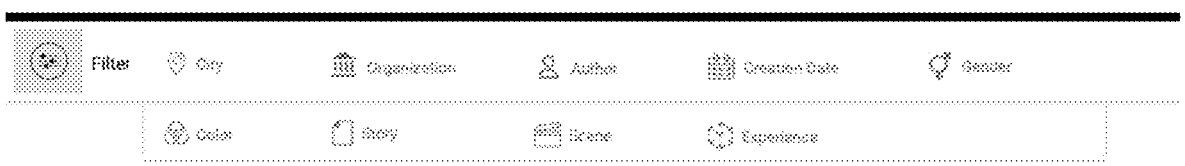
Figure 5.15

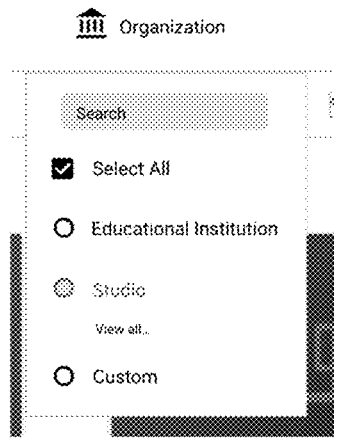
Figure 5.16
Figure 5.17

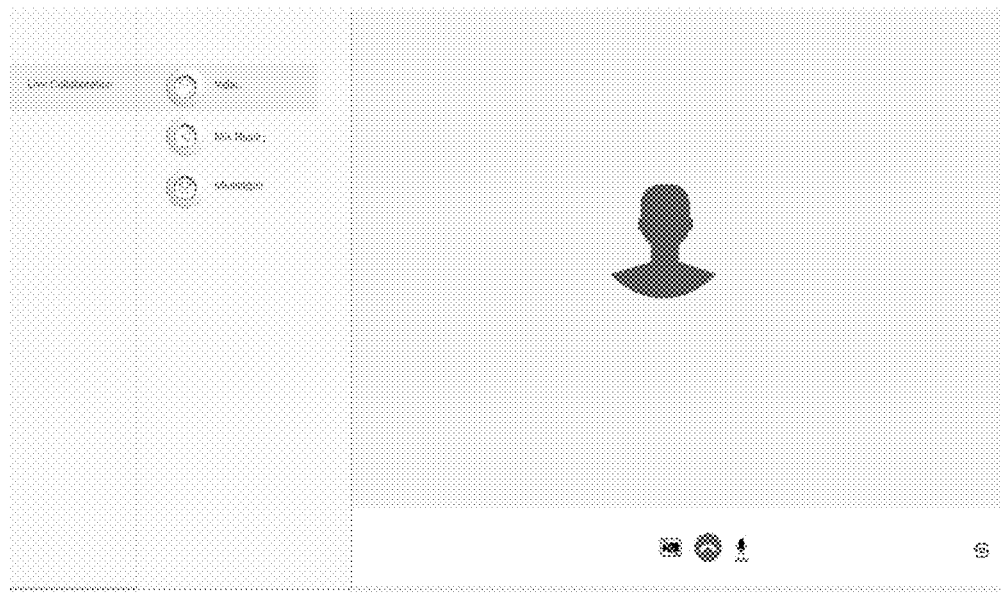
Figure 6.1
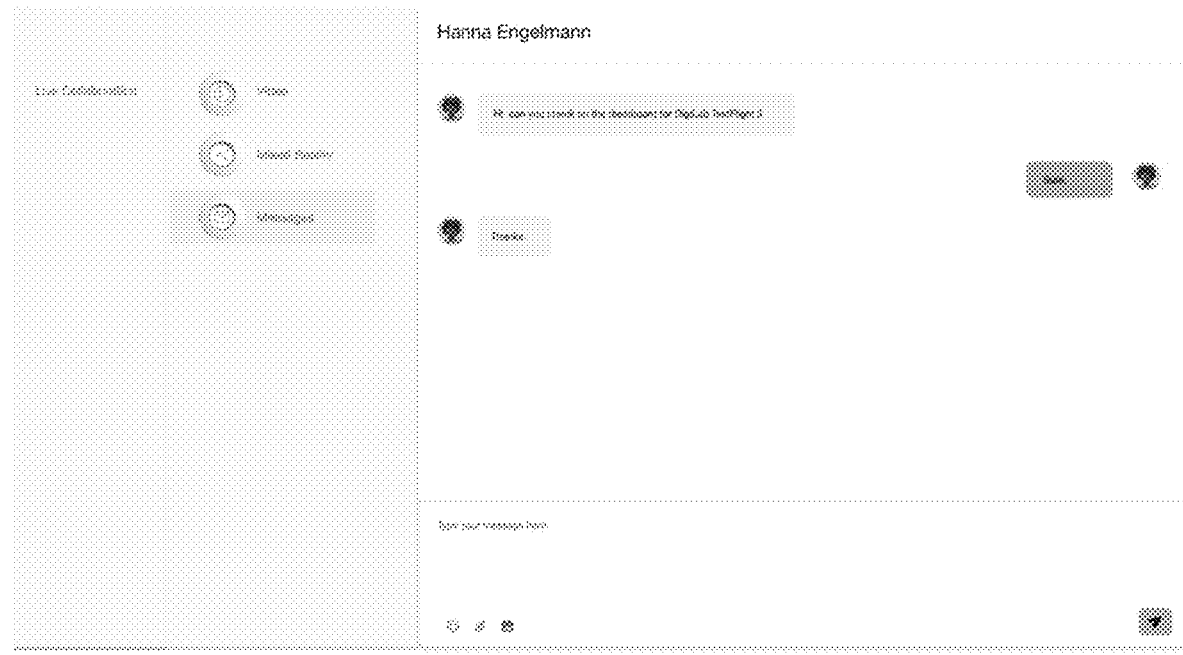
Figure 6.2

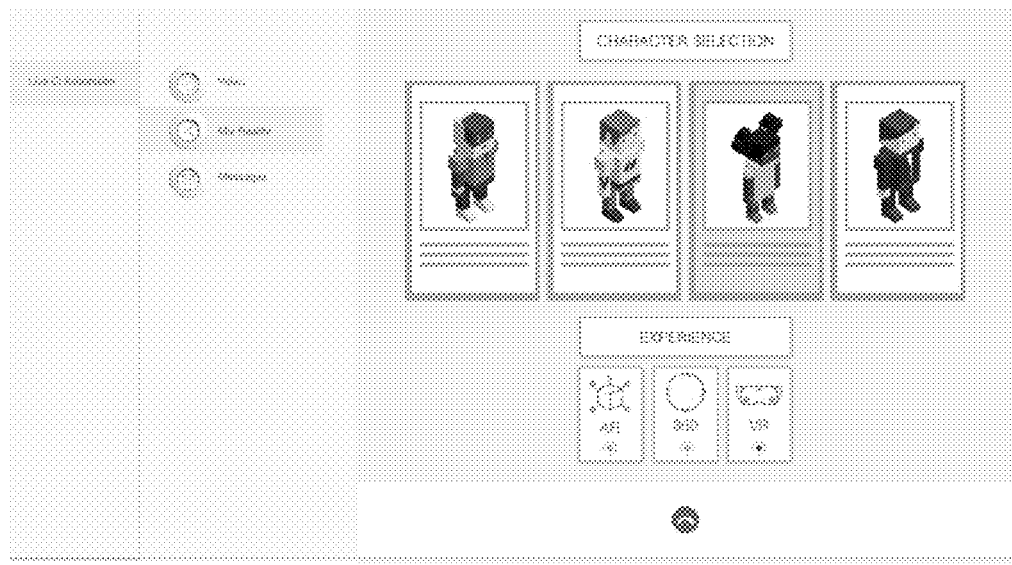
Figure 6.3
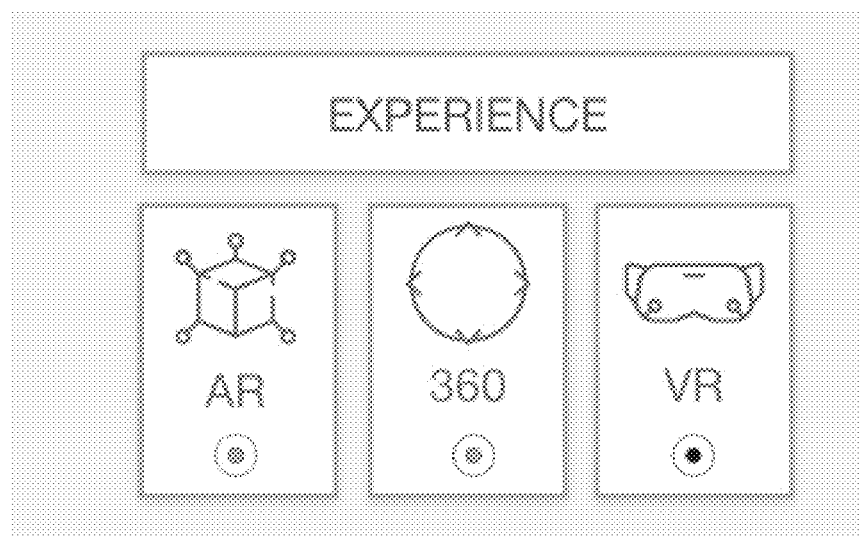
Figure 6.4

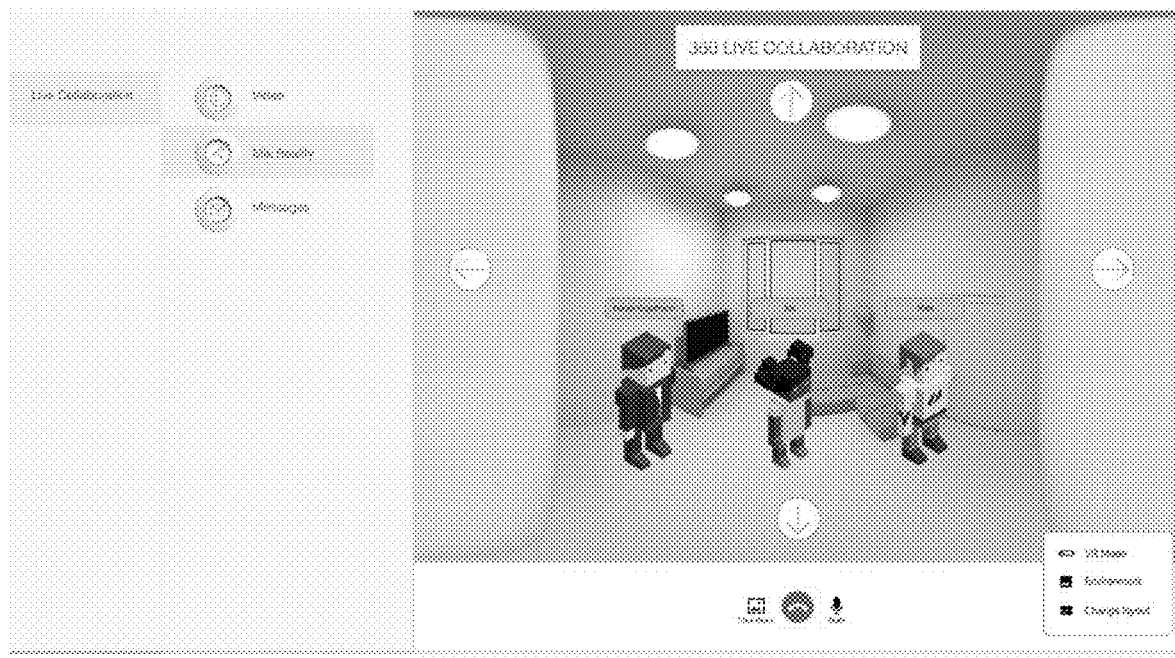
Figure 6.5
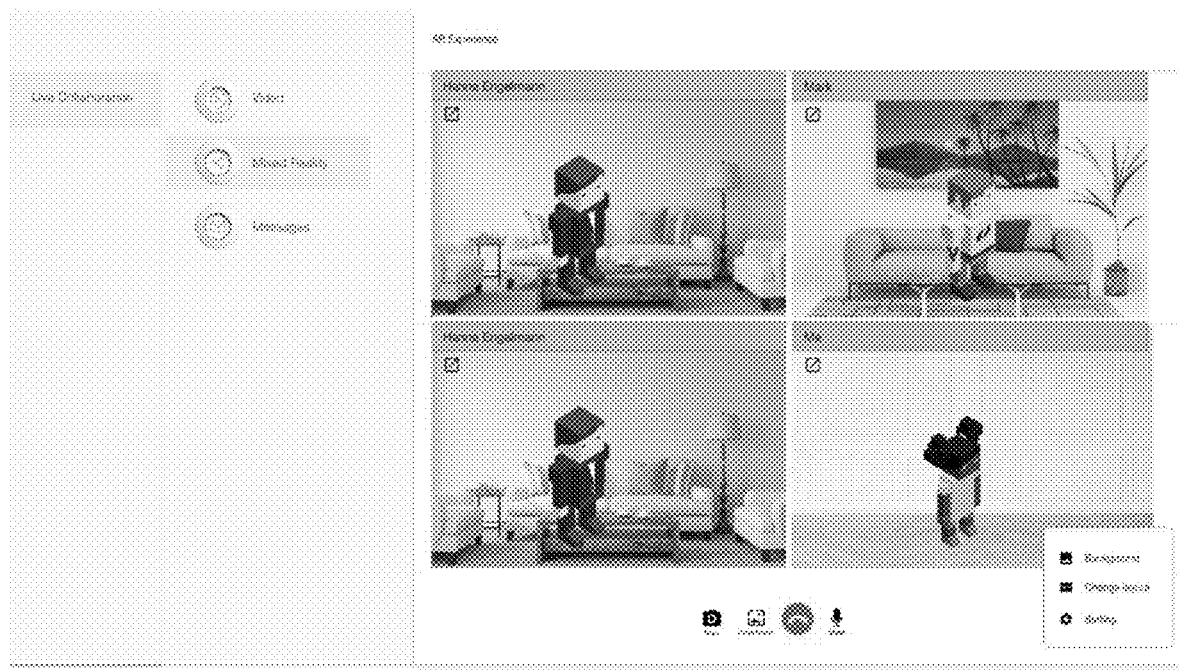
Figure 6.6

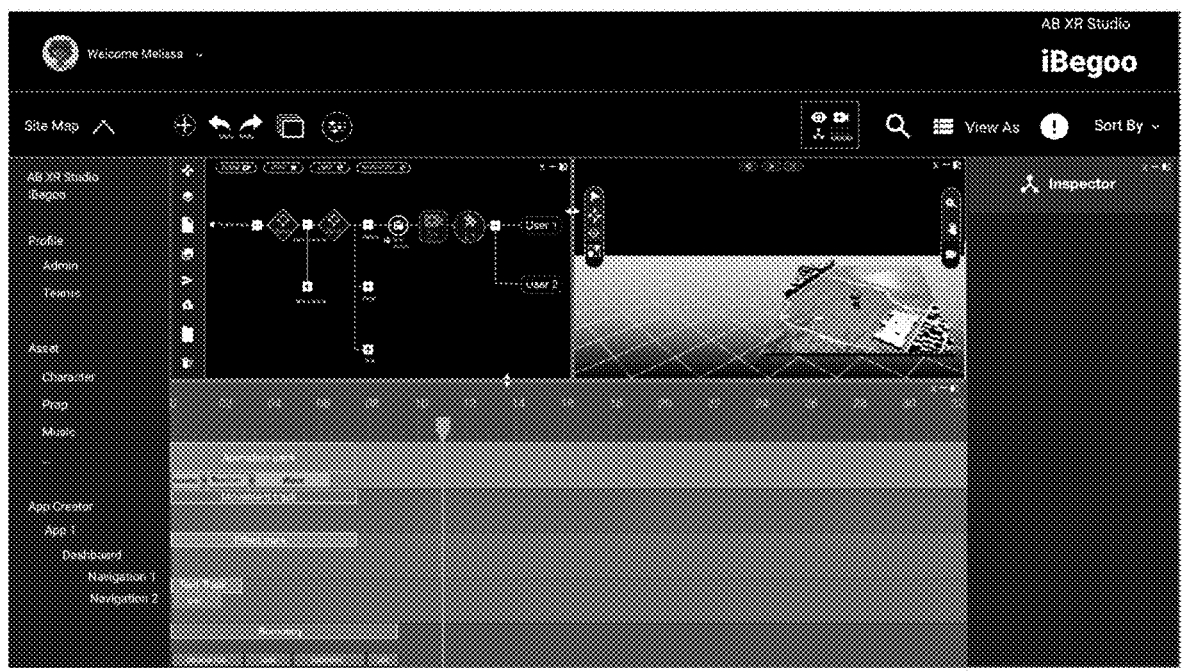
Figure 7.1

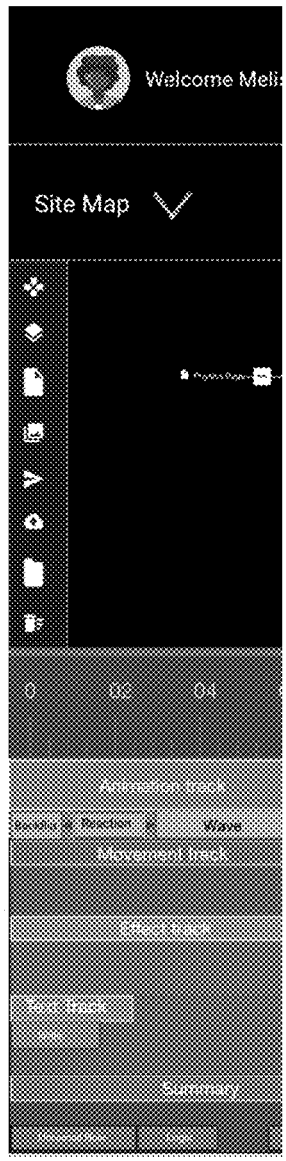
Figure 7.2
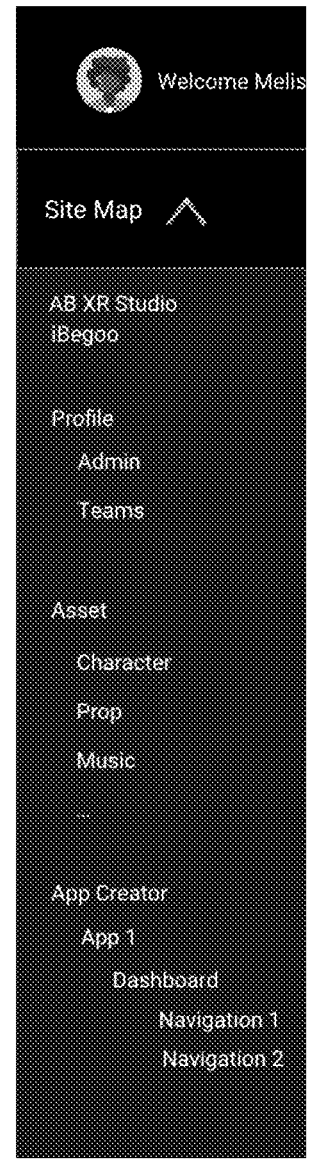
Figure 7.3

Figure7.4
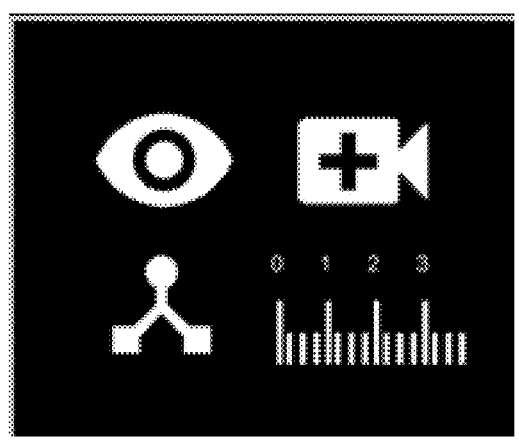
Figure 7.5

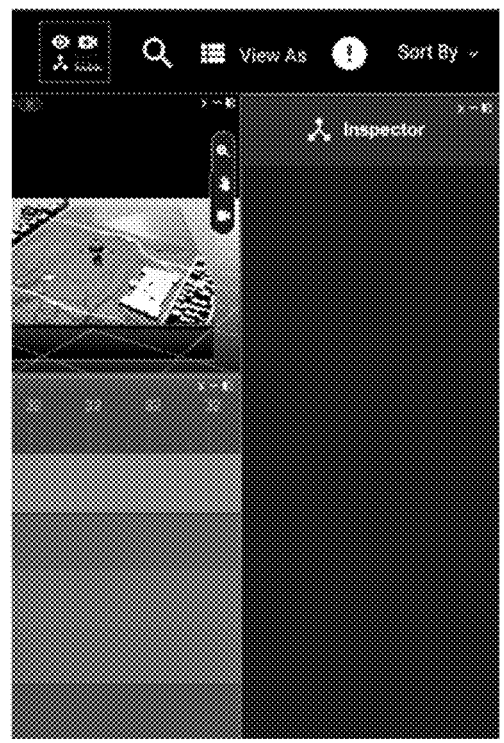
Figure 7.6
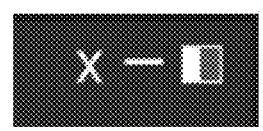
Figure 7.7

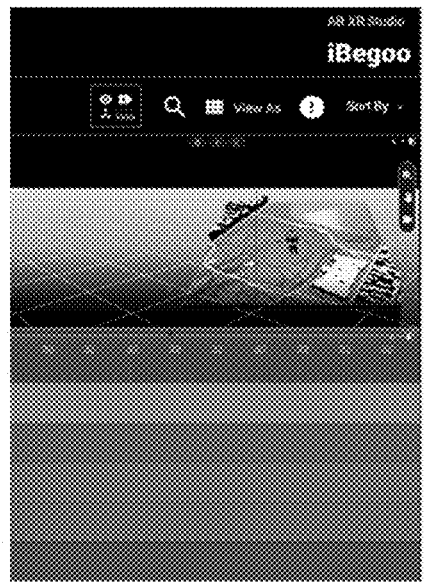
Figure 7.8
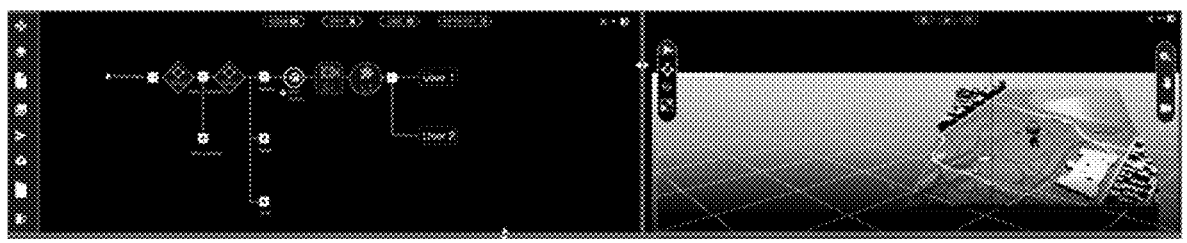
Figure 7.9
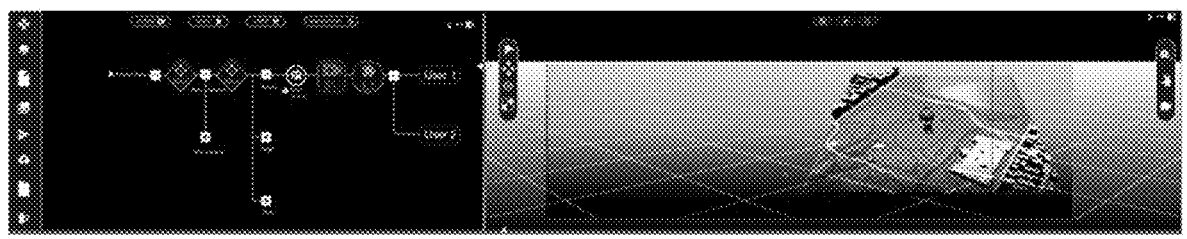
Figure 7.10

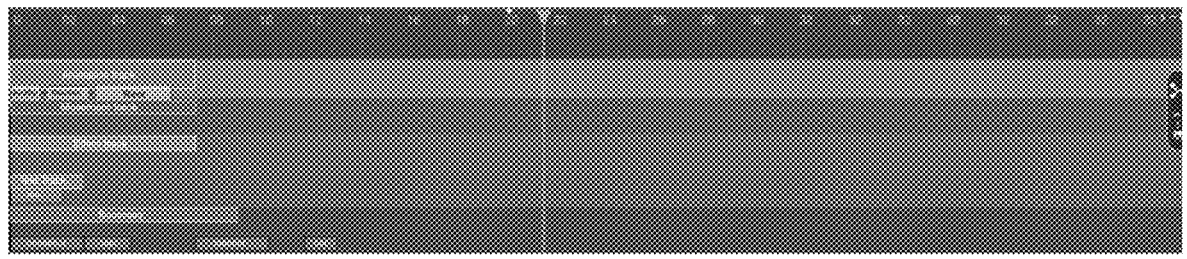
Figure 7.11
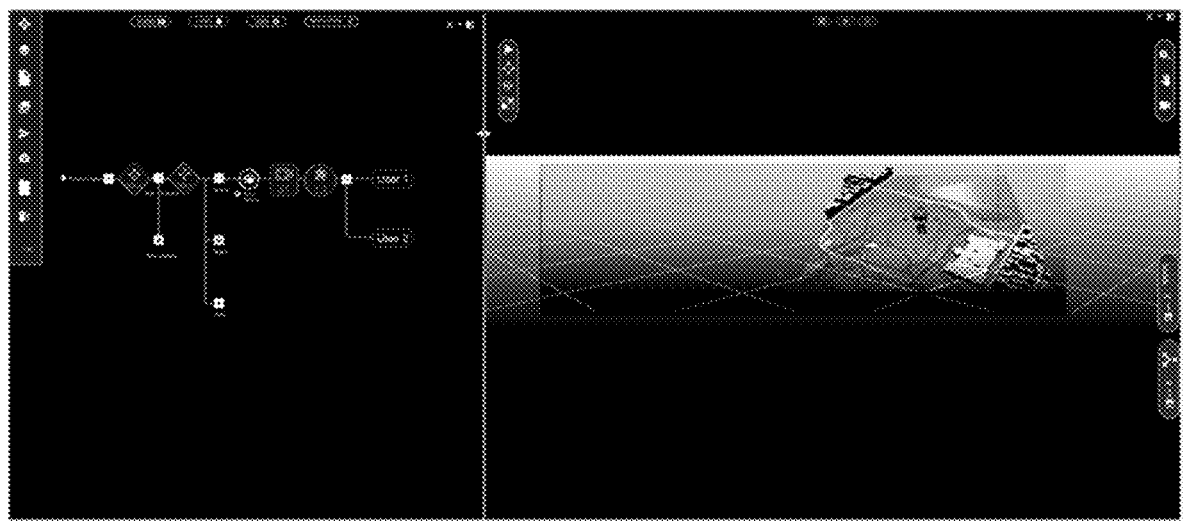
Figure 7.12

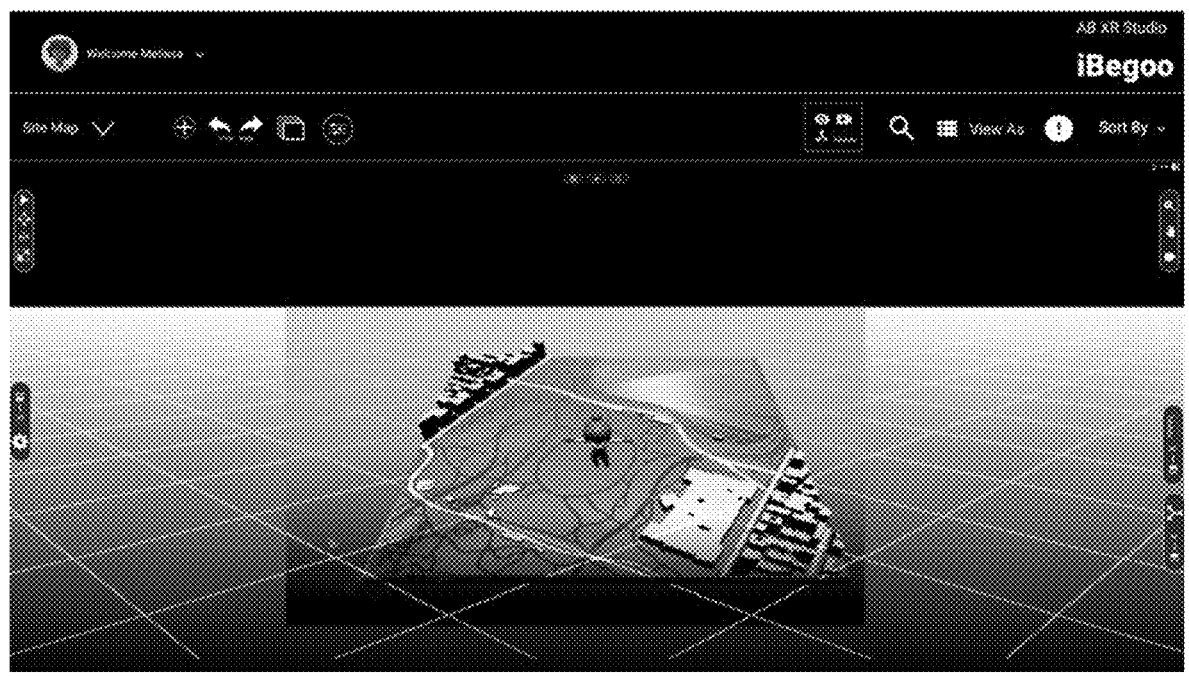
Figure 7.13

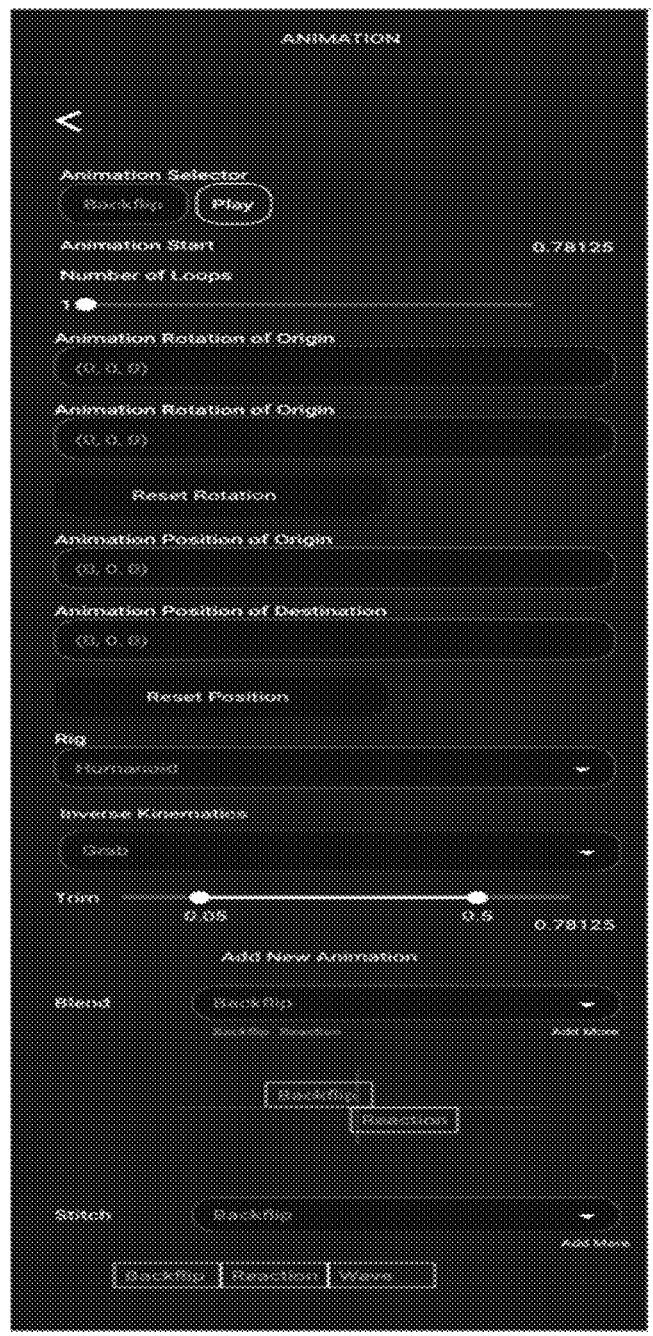
Figure 8.1

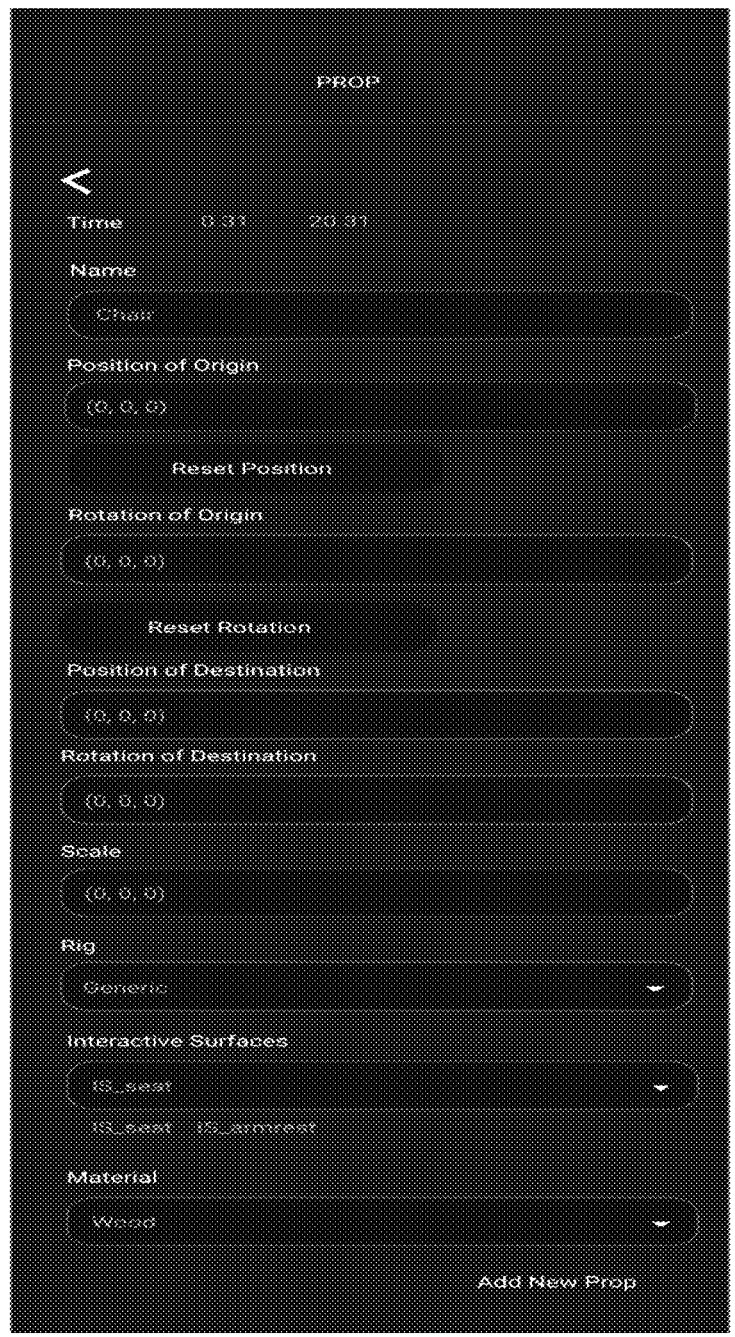
Figure 8.2

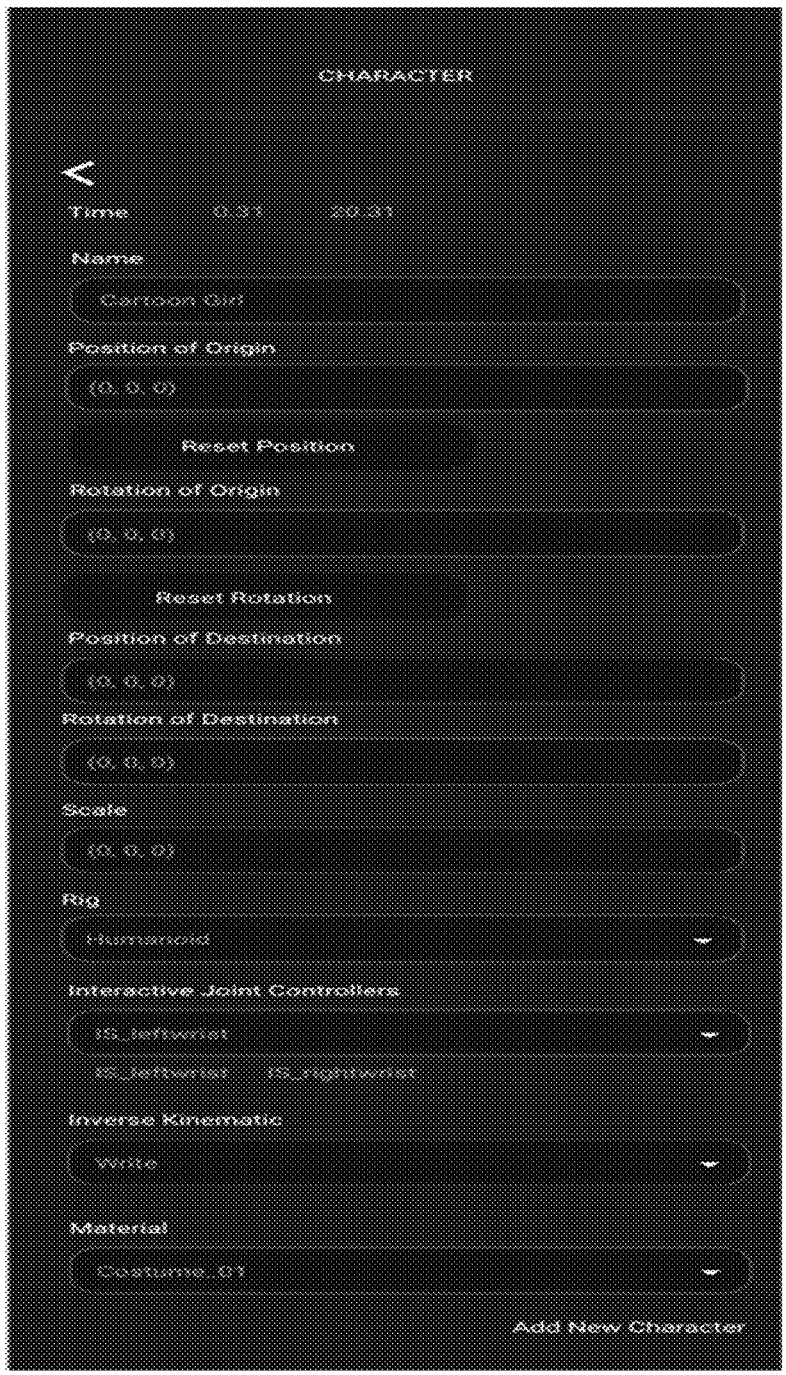
Figure 8.3

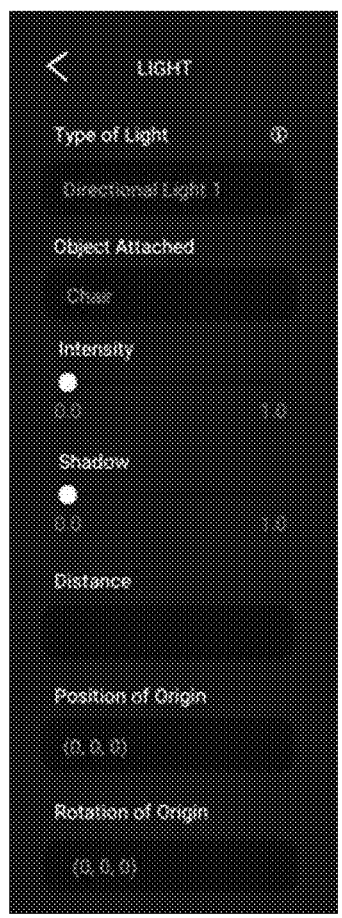
Figure 8.4

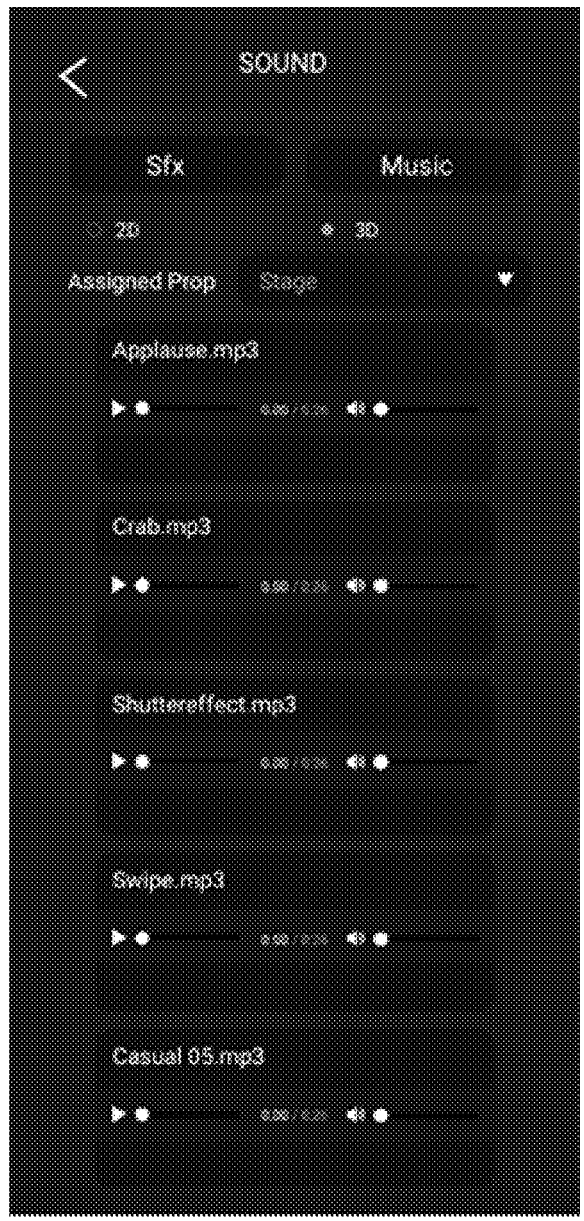
Figure 8.5

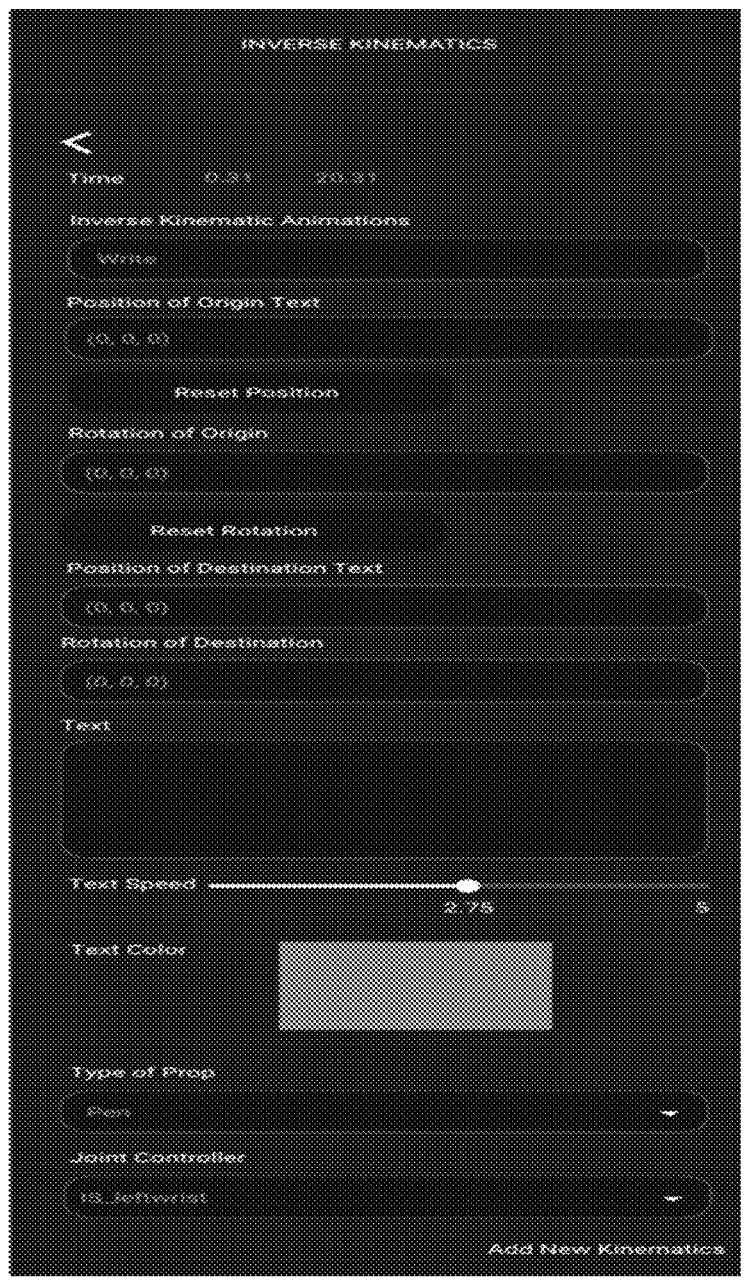
Figure 8.6

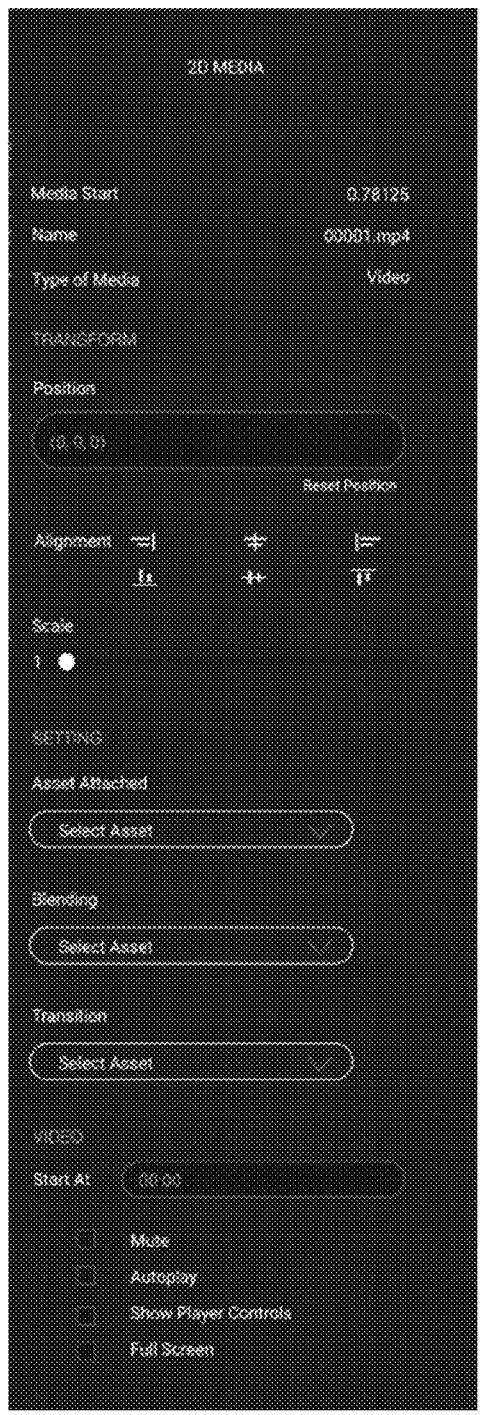
Figure 8.7

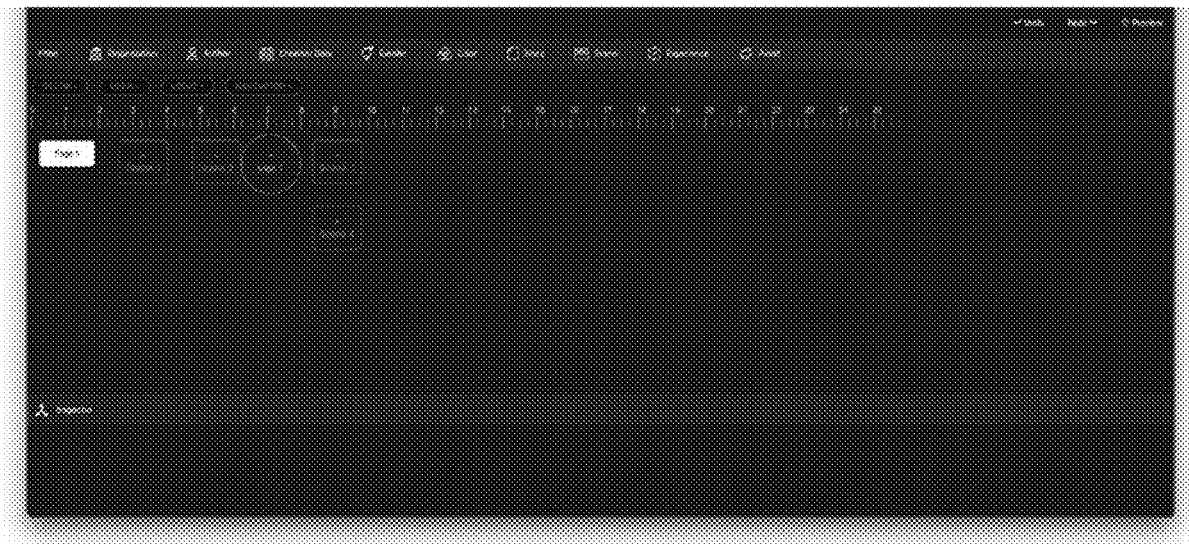
Figure 9.1
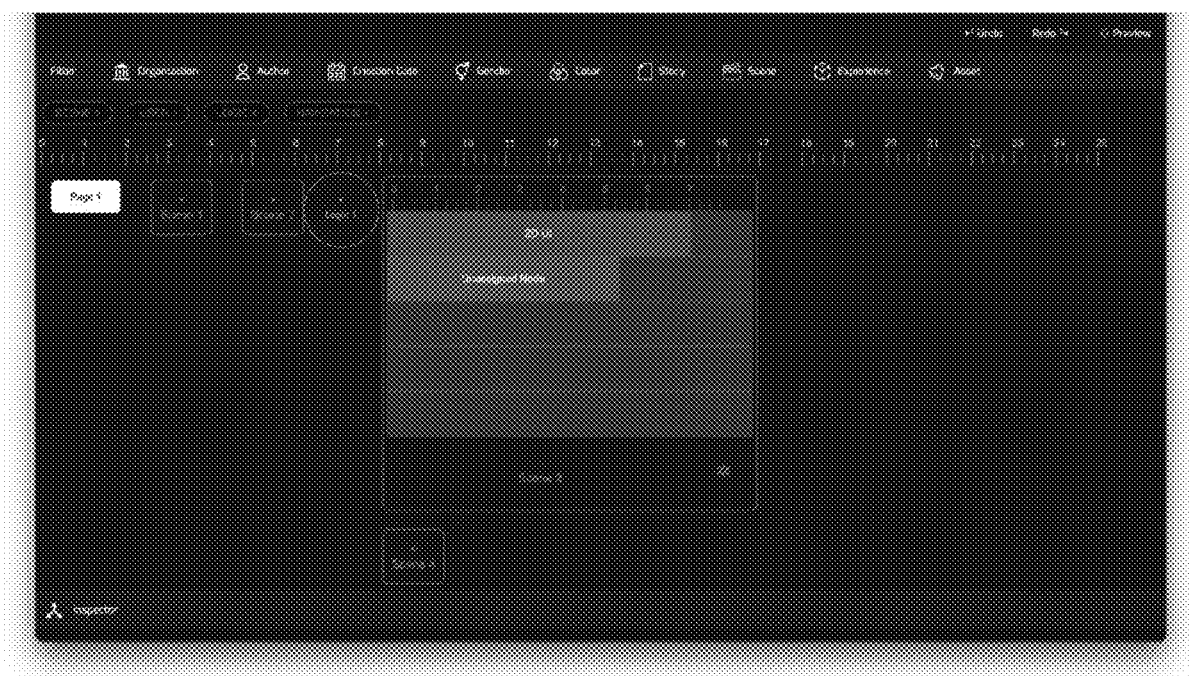
Figure 9.2

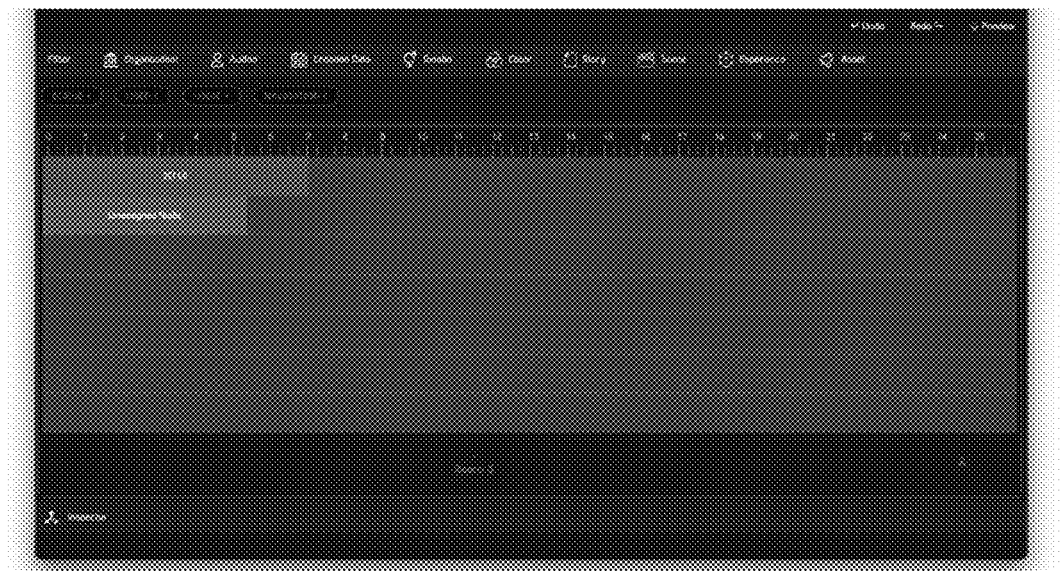
Figure 9.3
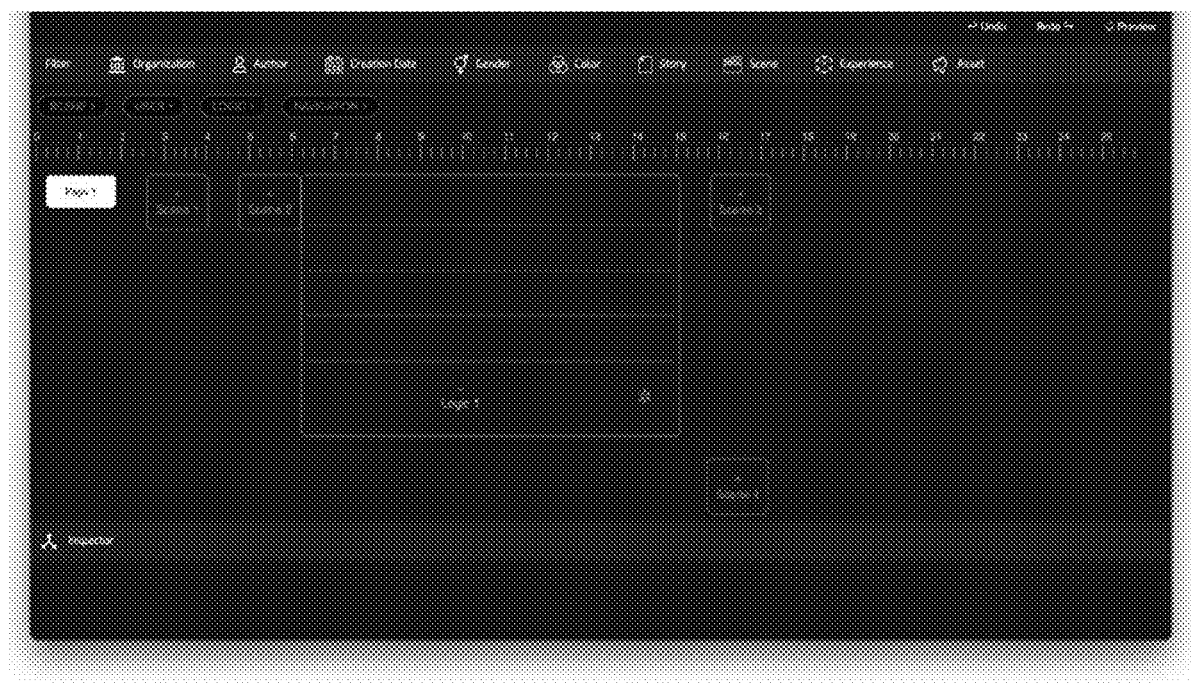
Figure 9.4

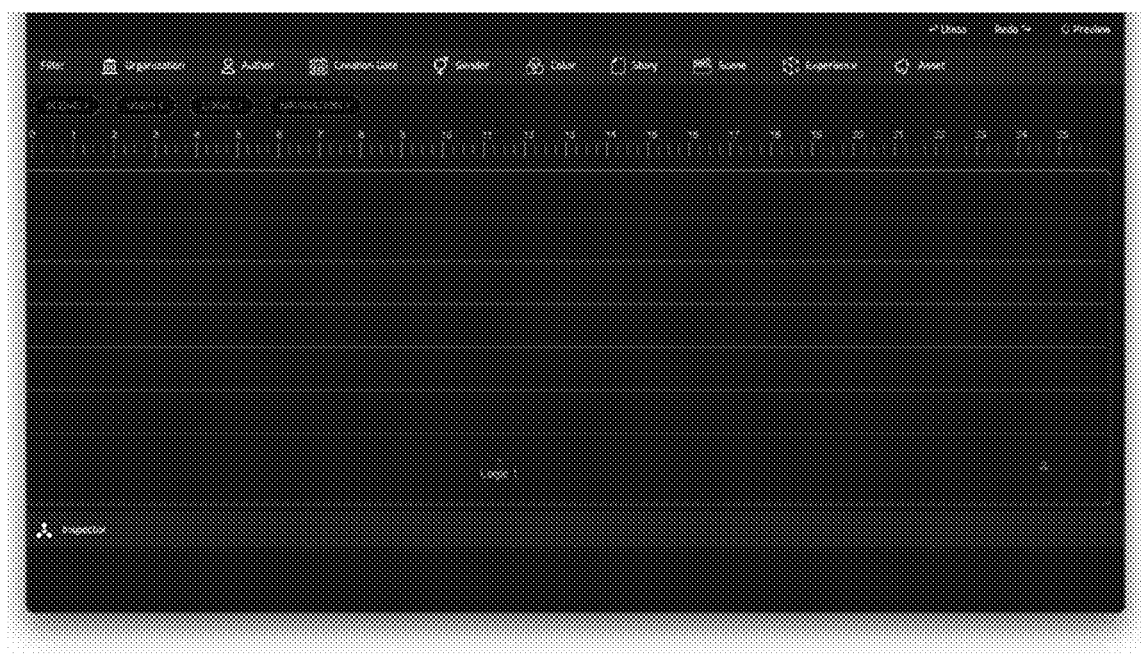
Figure 9.5

JSON-BASED TRANSLATION OF SOFTWARE PROGRAMMING LANGUAGE INTO AN ACCESSIBLE DRAG AND DROP WEB-BASED APPLICATION FOR CONTENT CREATION IN SPATIAL COMPUTING

RELATED APPLICATION

This application claims priority to application Ser. No. 63/190,718, filed May 19, 2021, entitled "JSON-Based Translation of Software Programming Language Into an Accessible Drag and Drop Web-based Application for Content Creation in Spatial Computing," the entirety of which is incorporated by reference herein.

BACKGROUND

Education and learning have been moving online so that users from anywhere in the country and also the world may participate in higher education. However, much of the online and remote learning is just a teacher being videotaped and streamed live to students. If animations are utilized, they tend to be static and linear. Better presentations and classes are needed to better engage students. Further, the online courses also need to be able to present different content for students that choose different paths.

Unity is developed by Unity Technologies and is utilized to create three-dimensional, two-dimensional, virtual reality and augmented reality games, as well as simulations and other experiences.

As of 2018, Unity had been used to create approximately half of the mobile games on the market and 60 percent of augmented reality and virtual reality content. Further, Unity technology is the basis for most virtual reality and augmented reality experiences. However, in order to write code or develop programs in Unity, a developer or program creator has to hire engineers proficient in Unity.

BRIEF DESCRIPTION OF THE DRAWINGS

A better understanding of the features, advantages, and principles of the present disclosure will be obtained by reference to the following detailed description that sets forth illustrative embodiments, and the accompanying drawings of which:

FIG. 5.1 illustrates that a creator can select from a number of logic types (e.g., touch, verbal, event, and/or probability);

FIG. 5.2 illustrates conditions, experiences or parameters for an interaction according to some embodiments;

FIG. 5.3. illustrates a probability type event or interaction according to some embodiments;

FIG. 5.4 illustrates different types of event types that may be created and/or selected by the creator according to some embodiments;

FIG. 5.5 illustrates a feature of being able to apply multiple logic events, conditions and/or parameters to a single logic event according to some embodiments;

FIG. 5.6 illustrates an edit logic node user interface screen according to some embodiments;

FIG. 5.7 illustrates a user interface menu for adding a node according to some embodiments;

FIG. 5.8 illustrates a view of a logic tree structure for a project file or a story file according to some embodiments;

FIG. 5.9 illustrates a toolbar according to some embodiments;

FIG. 5.10 illustrates a user interface for a Sitemap Module;

FIG. 5.11 illustrates an add feature and/or icon in a toolbar of the D3 software according to some embodiments;

FIG. 5.12 illustrates an undo and/or redo feature or icon in a toolbar of the D3 software according to some embodiments;

FIG. 5.13 illustrates a version control feature or icon in a toolbar of the D3 software according to some embodiments;

FIG. 5.14 illustrates a filter feature or icon in a toolbar of the D3 software according to some embodiments;

FIG. 5.15 illustrates a filtering category menu in the D3 software according to some embodiments;

FIG. 5.16 illustrates a category menu in the D3 software according to some embodiments;

FIG. 5.17 illustrates a custom category menu of the D3 software according to some embodiments;

FIG. 6.1 illustrates the D3 system including a video conferencing menu according to some embodiments;

FIG. 6.2 illustrates a messaging function or menu in an D3 system according to some embodiments;

FIG. 6.3 illustrates a first step in establishing an MR conference and the experience mode according to some embodiments;

FIG. 6.4 illustrates options for selecting the experience;

FIG. 6.5 illustrates a virtual reality (YR mode) in the 113 system according to some embodiments;

FIG. 6.6 illustrates an augmented reality (AR) mode of a meeting or class in the LB system according to some embodiments;

FIG. 7.1 illustrates an initial layout of the main story page for the story file, project file or class file;

FIG. 7.2 illustrates a collapsed Site Map (when the arrow is down);

FIG. 7.3 illustrates an expanded Site Map;

FIG. 7.4 illustrates icons for closing, minimizing and/or drag or dropping in an initial or main story screen according to some embodiments;

FIG. 7.5 illustrates preview, scene nodes, timeline buttons and/or inspector buttons in the main or initial screen menu;

FIGS. 7.6 illustrates an operation of an inspector module;

FIG. 7.7 illustrates an operation of an inspector module;

FIG. 7.8 illustrates an operation of an inspector module;

FIG. 7.9 illustrates movement of the movable bars to visualize more of the story file in additional screen space;

FIG. 7.10 illustrates movement of the movable bars to visualize more of the story file in additional screen space;

FIG. 7.11 illustrates a creator selecting a timeline display or view for the story file according to some embodiments;

FIG. 7.12 illustrates a creator selecting a two view layout of the story file or project file including a logic node view and a scene view according to some embodiments;

FIG. 7.13 illustrates a view of the created scene taking up most of the menu screen according to some embodiments;

FIG. 8.1 illustrates an animation module in the D3 system according to some embodiments;

FIG. 8.2 illustrates a prop module for selecting features, characters and/or parameters for props in the story file;

FIG. 8.3 illustrates a character module for selecting characters and associated parameters for a story or project file in an D3 system according to some embodiments;

FIG. 8.4 illustrates a light module for assigning lighting values to story files in an D3 system according to some embodiments;

FIG. 8.5 illustrates an audio module for assigning sounds in a story file or project file according to some embodiments;

FIG. 8.6 illustrates an inverse kinematics module in an D3 system according to some embodiments;

FIG. 8.7 illustrates a media module according to some embodiments;

FIG. 9.1 illustrates a logic treeline for a story file in the D3 system according to some embodiments;

FIG. 9.2 illustrates when a creator selects scene 3 which when expanded shows that there is an unassigned node and also that there is a two-dimensional user interface;

FIG. 9.3 illustrates a logic treeline module may generate a better view of the scene in the story file by expanding the selected scene according to some embodiments;

FIG. 9.4 illustrates when a creator selects logic node 1 which when expanded shows the conditions, parameters and/or paths when the different conditions are selected according to some embodiments; and FIG. 9.5 shows the expanded view when different conditions are selected according to some embodiments.

Figure 1:
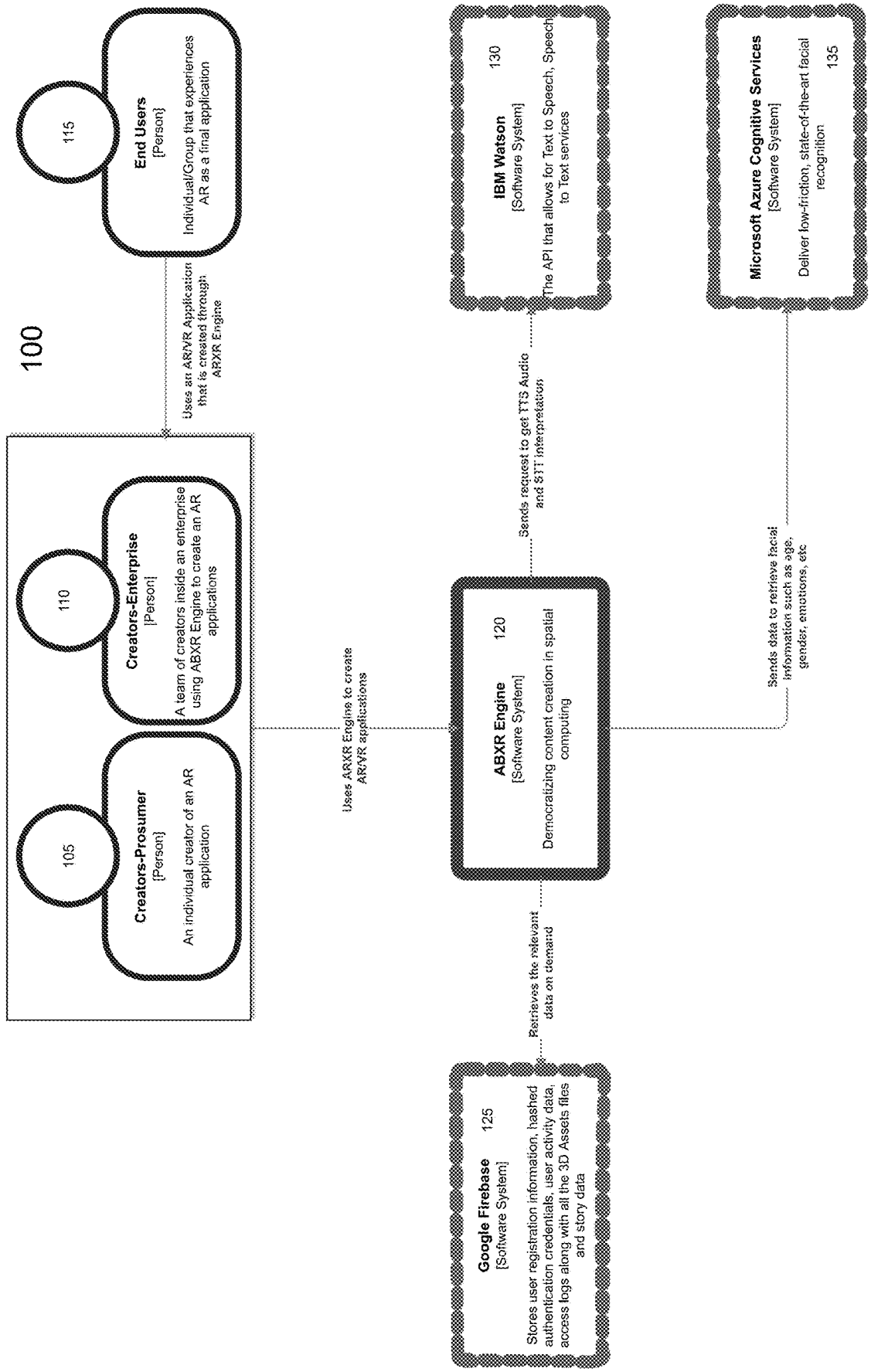
FIG. 1 illustrates an overall system and context architecture utilizing iBEEGO ("IB") or ABXR software application for creating an ARVR application according to some embodiments.

You can select the cross button to close the inspector

DETAILED DESCRIPTION

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

The Ibeegoo ("IB") Web Application 405 allows creators and users to produce interactive and visually appealing story files very easily (which may include animation). In prior systems, every scene had to be animated separately and individuals who knew javascript had to be hired in order to create every scene. Thus, this required story creators to identify every character, environment and object in a scene as well movements and/or orientations for characters and/or objects. In order to do this technical coding expertise was required in order to identify the right code to perform the movements, actions and/or orientations for each scene. In addition, if there is any change in any of the elements mentioned above, these changes needed to be addressed and changed for that scene. This resulted in significant addition in costs. As an example, if different individuals (with different heights and different body characteristics) sat in one chair then the sitting motion had to be addressed for the different individuals because for example tall people and short people would look different in sitting on a chair that is the same chair. Similarly, if a character moves within different rooms in a building or for example a house, chairs, sofas, or bar chairs may have different heights and even though the character had the same height, their sitting motion would be different for the chairs of different heights. Similarly, environment (room image, lighting, and/or color) may also need to be changed. In order to address these issues, the D3 Web Application 405 automates the story creation file process by having the users, creators and/or producers select different elements and/or items (and in some cases values for the different elements and/or items) for each scene and/or also to identify a timeline for all of the created scenes. As an example, a creator, user and/or producer may create a story file for a new game object. The creator, user and/or producer may select and/or identify scenes for the story file. The creator, user and/or producer may then add character(s), environment(s) (background, scenes, lighting, etc.), 3D models, desired animation(s) (e.g., movements of characters and/or objects), video(s), 2D media(s) and/or sound(s) for each of the scenes utilizing the modules described above. In addition, the D3 Web Application 405 may also add in logic elements and decision tree elements for the different scenes (e.g., how the scenes are related to other scenes, different options the character may make within the scene (such as would you like to go outside, go to the playground or the kitchen), and/or the resulting changes that need to be made to the other elements based on the decisions). When the user, creator or producer is creating the story file, the user may utilize the story editor module and/or story manager module. The story manager module may pull information, parameters, story elements and/or timeline elements from the Firebase Realtime Database (which includes the Firebase Assets database 452, the Firebase Story Database 453 and/or the Firebase Timeline Database 454). During the creation and/or generation of the story file, the user, creator and/or producer may desire to see and/or view how different elements may be seen in the game object. The D3 Web Application 405 allows a creator, user and/or producer to change different elements (e.g., characters, lighting, sounds, or animations) and see the result of the changes in real-time or close to real time. This allows a user, creator or producer to see changes without having to create the entire story json file and saves significant time.

Please note that that AB may stand for Amir Baradaran Studios in this application. D3 and/or AB and ABXR may be utilized interchangeably in some embodiments of the present application.

Based on all of this information and after the plurality of scenes have been created, the D3 Web Application 405 may then create and/or generate the story json file for the created story based upon the elements selected by the users, creators and/or producers. The D3 Web Application 405 then stores the created or generated story file in the Firebase Database long term storage (e.g., the story export database 455). After the D3 Web Application 405 has stored the created or generated story file in the Firebase Database storage system, the creator, user and/or producer may access the created or generated json story file and play it or experience it. This is another took that allows the the user, creator and/or producer to run or execute the story json file to determine if there are any areas that need improvement, e.g., changing elements, changing logic transitions or elements and/or changing decision tree transitions or elements. After the story json file has been stored in the Google Firebase database, the user, creator or producer may allow end-users to access and/or experience the created story file through the D3 Mobile Application 205.

The online education environment is one market that the D3 Mobile Application and/or Web Application can be utilized in. Specifically, story files may be created for lectures and/or courses for online education programs that are being presented to remote students. Many schools are making all large lecture classes remote so that large groups of students do not gather in one location at the same time. The university or high school teachers (or creators or users)

may add in the relevant materials and/or programs and utilize more engaging experiences (such as animations, videos, sound files, etc.) in order to keep the student's attention as well as to provide students with a more interactive and/or hands on approach. In addition, the D3 Mobile Application and/or Web Application allows for alternative paths of learning to be presented to the students because many students learn in different ways. Also, this system will be beneficial if labs are needed because more realistic experiences can be utilized to attempt to teach the students. Further, teaching assistants may be able to utilize the system to help in sessions that go over homework so that both visual and/or audible feedback may be presented to the students (along with animations, videos, 3D models and/or sound files).

FIG. 1 illustrates an overall system and context architecture utilizing iBEEGO ("IB") or ABXR software application for creating an ARVR application according to some embodiments. In this embodiment, the system architecture 100 may include a creator/prosumer 105, a creator/enterprise 110 (e.g., one or more creators that may be located in an entity), one or more end users 115, an ABXR software engine 120, one or more databases 125 (e.g., which may utilize Google Firebase), a speech-to-text and text-to-speech converter 130 (e.g., which may utilize IBM Watson), and/or a facial recognition or facial rendering program 135 (e.g., which may be Microsoft Azure cognitive services). In some embodiments, a creator/prosumer 105 may be an individual who is creating and/or generating content and/or an AR software application utilizing the ABXR software engine 120. In some embodiments, a creator/enterprise 110 maybe two or more creators or individuals who are utilizing the ABXR software engine 120 to generate content for and/or create an AR software application. In some embodiments, the one or more end-users 115 are individuals who may be utilizing and/or experiencing the created AR software application. In these embodiments, one or more end-users utilize the AR mobile software application to utilize and/or experience the AR software application (e.g., IBegoo ("IB") or AB Studios Digilab ("AB")mobile software app). One of the centerpieces of the claimed subject matter is the ABXR software engine 120, which is a number of components (that will be described below that generate the content and/or the software code for the AR software application. In these embodiments, the ABXR or D3 software engine 120 may be described as democratizing content creation in spatial computing. In other words, the ABXR software engine 120 may allow creators who don't have a specific background in Unity (or the computing languages that implement or execute Unity) to prepare scripts, stories, experiences, and/ or visual routines that may be converted into software code, applications and/or programs that may be interpreted and/or executed by a Unity software engine. This is one of the unique or novel features that significantly decreases software development time for the created or generated AR/VR software applications. In some embodiments, the ABXR or D3 software engine 120 communicates and/or interfaces with one or more databases 125 from which the software engine may store and/or retrieve information. In one implementation, one or more databases may be Google Firebase. In some embodiments, the one or more databases 125 may store, house, and/or provide access to user registration information, hashed authentication credentials, user activity data, access logs along with all the 3D Assets files and/or story data. In some embodiments, the ABXR software engine 120 may communicate with the speech recognition application 130 (e.g., IBM Watson) for speech-to-text services and text-to-speech services. In other words, the ABXR software engine 120 may communicate requests to get text-to-speech audio and/or to receive speech-to-text interpretations. In some embodiments, the ABXR engine 120 may communicate data to the facial recognition or analysis software 135 (e.g., which may be Microsoft Azure cognitive services) to receive facial or animation information such as age, gender, emotions, etc.

Figure 2:
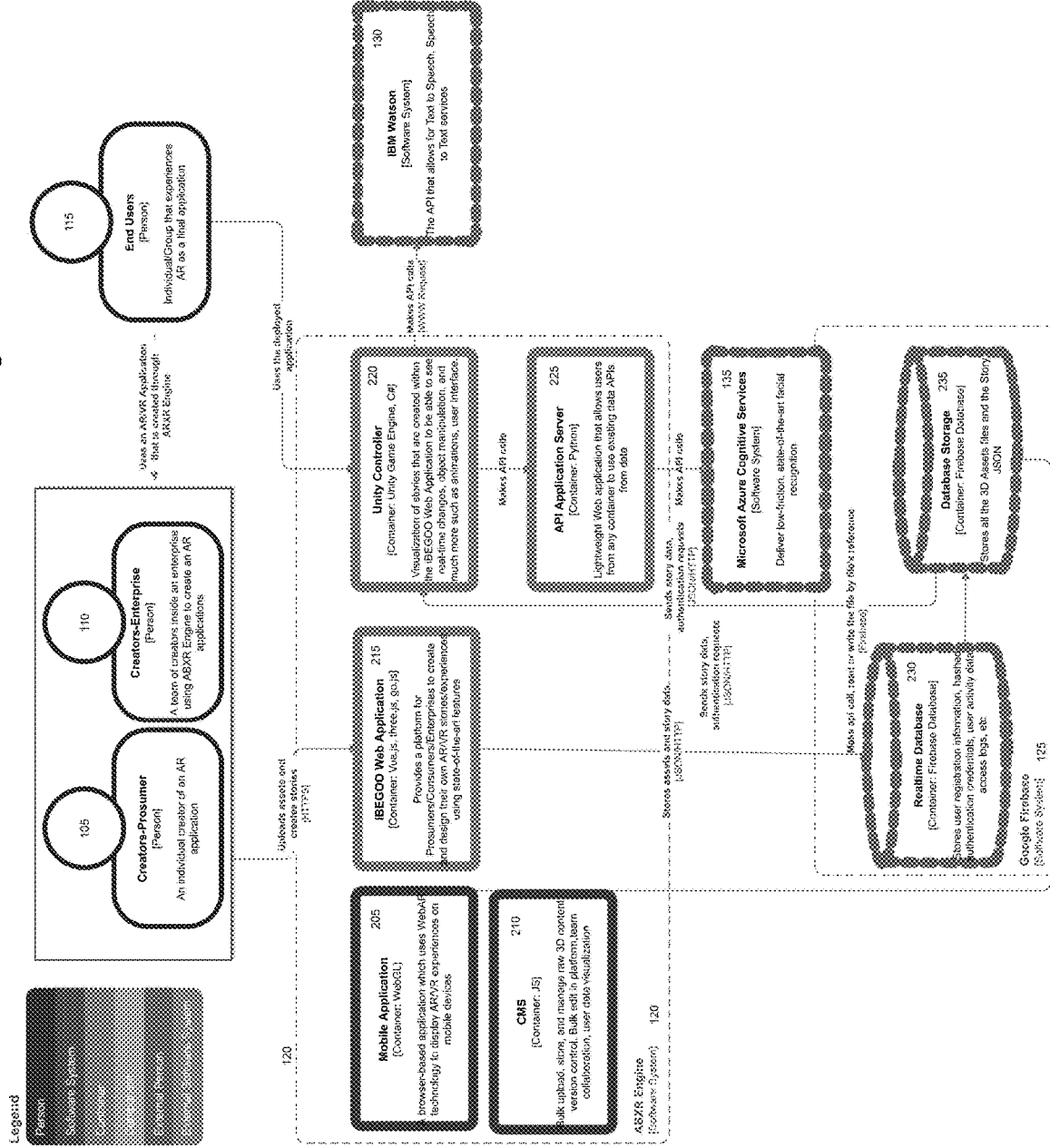
FIG. 2 illustrates additional details and/or containers of the ABXR software engine 120 and/or the one or more databases 125.

FIG. 2 illustrates additional details and/or containers of the ABXR software engine 120 and/or the one or more databases 125. In some embodiments, the ABXR software engine 120 may comprise the D3 AR Web application 205, the CMS module 210, the D3 Web application 215, the Unity Controller 220, and/or the API Application Server 225. In some embodiments, the one or more databases 125 may be Google Firebase database servers and may include the real-time database 230 and the database storage 235.

In some embodiments, one or more databases 125 may be an application programming interface (API) that allows the ABXR software engine 120 to store the generated data within a database and to use the generated data to communicate between the Unity Controller 220 and the D3 Web application 120. In some embodiments, one or more databases may be utilized to store assets and/or metadata that is gathered upon using the D3 Web application 215 such as user information or parameters, story details, asset bundles, organizations, and/or setting parameters.

In some embodiments, the AB Web AR application (or D3 Web Application) 215 may be utilized by producers, creators, and/or enterprises or companies to create AR stories utilizing their ideas. In some embodiments, the producers, creators, and/or enterprises may create and/or design their own AR/VR stories and/or experiences utilizing advanced filtering, three-dimensional (3D) preview, a story editor (which may be customized, and/or an asset management system). In some embodiments, the Web AR system 215 may be a multi-user collaborative embodiment where multiple users may edit and/or manage stories and/or experiences with real-time feedback. The multi-user collaborative environment is not limited to the Web AR system but also extends to the phone or mobile computing device application (which may be Unity files). For this patent application, the stories and/or experiences may be referred to as story files and/or experience files. In addition, the multi-user collaborative environment may also extend to mobile applications (e.g., mobile phone or computing devices). In these embodiments, the Web-AR system may be utilized by creators or users so that they don't have to download the mobile phone software application from the App Store or Google Play store and may simply run or execute the software application utilizing the browser that is supported on the mobile communication device. In these embodiments, the story files and/or experience files generated by the D3 Web AR system 120 may be stored in one or more databases 125 (which may be a Firebase database. In some embodiments, the Web-AR may be a replacement for a native phone or mobile computing device application where the end-users don't have to download the application from the App Store or Google Pay store and may simply run the experience from their supported browser.

In some embodiments, the Unity Controller System 220 may be a main control application or software that is made utilizing the Unity programming language. In some embodiments, the Unity Controller System 220 may communicate with one or more databases 125 to deserialize data that may be utilized by the D3 Mobile Application. In some embodiments, the Unity Controller 220 may implement and/or initiate the visualization of the story files and/or experience files that are created within the D3 Web Application 215 in order for creators or producers to see real-time changes that have been made to the story files or experience files as well as to also see or visualize object manipulation, animations and/or the user interface. In these embodiments, the Unity Controller does not interface directly with an end-user utilizing the D3 Mobile Application, however, the Unity Controller 220 may generate a playback and/or execution of the story files or experience files so that the story timeline or experience timeline may be viewed in the D3 Mobile Application based on the end-user's live interaction.

API Application Server System: The API Application Server is a lightweight Web application that allows users from any container to use existing data APIs from data, without the need for custom development. This allows a clean working environment which minimizes the probability of congestion and duplication.

In some embodiments, the D3 Mobile Application 205 may be installed and/or stored on a mobile computing device (such as a tablet, a smartphone, a laptop computing device, a wearable computing device and/or other computing devices). The D3 Mobile Application 205 is comprised of computer-readable instructions stored in one or more memory devices of the mobile computing device, where the computer-readable instructions are accessed and/or executable by one or more processors of the mobile computing device in order to initiate and/or operate the IR Mobile Application. In some embodiments, when the IB Mobile Application 205 is initiated and running, the D3 Mobile Application 205 communicates with the Unity Controller module or system 220 in order to play and/or experience the stories (e.g., story files) created by creators, prosumers and/or enterprises. In some embodiments, the D3 Mobile Application 205 is written or made with Unity.

Figure 3A:
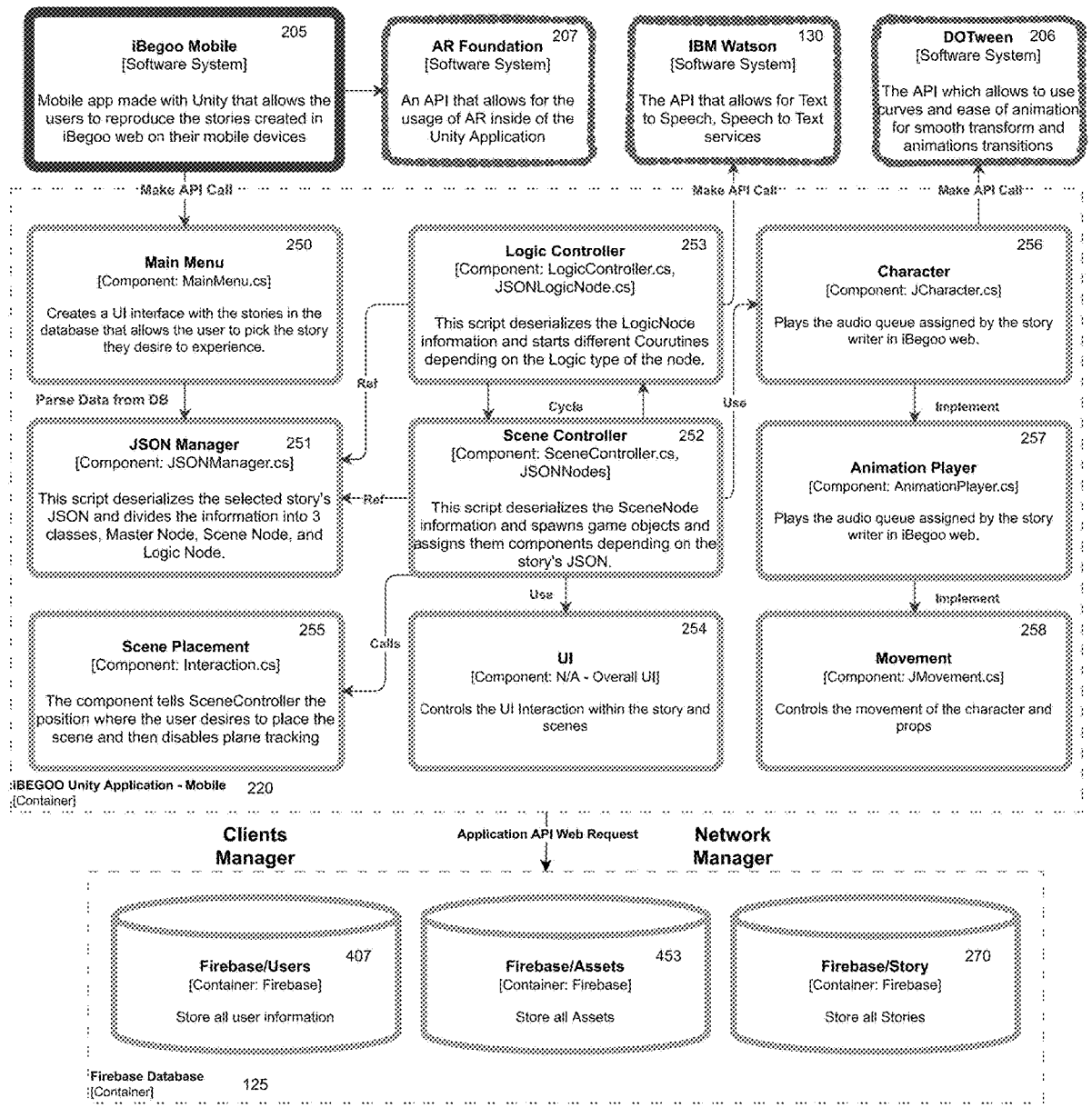
FIGS. 3A and 3B illustrate the Unity Controller Module operation and/or interaction with the Mobile Application 205 according to some embodiments.
Figure 3B:
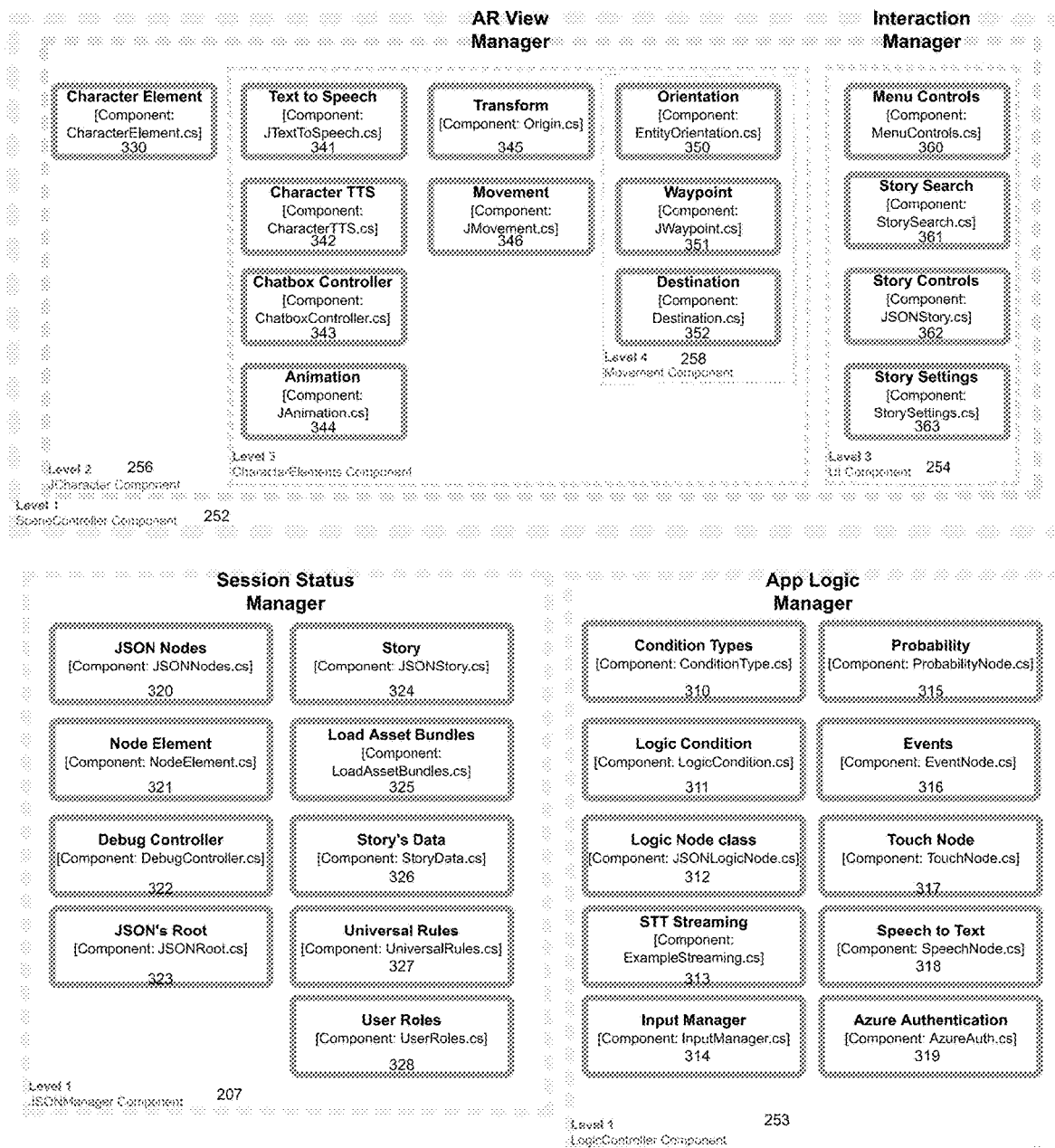

FIGS. 3A and 3B illustrate the Unity Controller Module operation and/or interaction with the Mobile Application 205 according to some embodiments. In order to start interfacing with the Unity Controller module 220, the D3 Mobile Application 205 may make an application programming interface (API) call to the main menu module 250 (of the Unity Controller Module). In some embodiments, the main menu module 250 creates a user interface display or screen that lists or presents the stories (or story files that are stored in the one or more Firebase databases 125 (or the database module 125)).

In response to the end-user selecting to experience a specific story (or story file), the main menu module 250 may communicate with the one or more databases 125 (via an application API request) and specifically may communicate with a firebase/story database 270, where all the stories (e.g., story files) are stored. In some embodiments, the selected story (e.g., the story file) may be communicated to the JSON Manager module 251. In some embodiments, the JSON Manager Module 251 may parse the retrieved or downloaded story (e.g., story file) from the one or databases 125). In some embodiments, the retrieved story file may be a JSON file. The JSON Manager Module 251 may deserialize the selected story JSON file and divide the deserialized information into three classes, the Master Node datafile, the Scene Node datafile, and the Logic Node datafile. In some embodiments, the Master Node datafile may be utilized to coordinate the operation of the Scene Node datafile and the Logic Node datafile. In some embodiments, the Master node datafile may be a parent node that includes several child nodes (and the child nodes may include Scene nodes and/or Logic nodes).

The Scene Controller module 252 receives the Scene Node datafile from the JSON Manager module 251 and spawns and/or generates game objects and assigns the game objects components based at least in part on the JSON file and/or the Scene Node datafile. In some embodiments, the components may come from a variety of other modules (e.g., the Logic Controller module 253, the UI module 254, the scene placement module 255, and/or the character module 256).

In some embodiments, the Logic Controller module 253 may receive the Logic Node datafile and may deserialize the LogicNode datafile to start different coroutines (e.g., or parallel routines) depending on the logic type of the node.

In some embodiments, the Scene Placement module 355 may communicate with the Scene Controller module to instruct the Scene Controller module 255 a position where a user may desire to place a scene and/or may also disable plane tracking that will halt the detection of surfaces in a user's real-world environment. In some embodiments, plane tracking in augmented reality may mean surface detection, which may be vertical or horizontal surface detection. In these embodiments, the surfaces in the real-world may be detected utilizing simultaneous localization and mapping (SLAM) to get an accurate representation of the area around the user so that virtual objects can be augmented on real surfaces.

In some embodiments, the User Interface (UI) module 254 may communicate with Scene Controller module 252 and may control the UI interaction within the story files and/or the scenes.

In some embodiments, the Character Module 256 may play the audio queue assigned to the selected story file. In some embodiments, the Scene Controller module 252 may need to deserialize the SceneNode data file which includes character data or parameters. This Controller character data may then be used to populate the scene with Scene Controller module 252, and may detect touch input with Input Manager. In some embodiments, Scene module 252 may also begin deserialization of Transform Element datastream, and Character Element datastream.

In some embodiments, the Scene Controller module 252 may communicate with the Animation Player module 257 in the case that an animation file needs to be played. The Animation Player module 257 may control the flow of the animations, keeping track of the time of animation and when the animation ends. In some embodiments, the Animation Player module 257 may also cycle through other animations as long as they are on a specific timeline. In these embodiments, the Animation Player module 257 may also read directly from a story JSON data file to determine all of the animations the specific game object includes, and cycles through all the animations until the very last animation in the game object or JSON datafile.

In some embodiments, the Character module 256 and/or the Scene Controller module 252 may utilize the Movement Module 258. In some embodiments, the Movement Module 258 may control the movement of the characters and/or prop elements. In some embodiments, the Movement Module 258 may extract or receive the deserialized data from the JSON datafile that is designed for the movement block. In these embodiments, the movement data or parameters may manipulate an object's movement through the DOTween module 206. The DOTween Module 206 is an application programming interface that allows utilization of curves as well as the ease of animation for smooth transform and animation transitions. The Movement Module 258 may be utilized to deserialize movement paths based on waypoint parameters, duration parameters, and/or orientation parameters.

In some embodiments, the Logic Controller module 253 may include a Condition Type Module 310, a Logic Condition module 311, a Logic Node Class module 312, a speech-to-text (STT) Streaming module 313, an input manager module 314, a probability module 315, an event module 316, a touch node module 317, a speech-to-text module 318 and/or an Azure Authentication module 319.

The Logic Controller module 253 and the JSON Manager module 251 utilize the input manager module 314. In some embodiments, the input manager module 314 utilizes and/or interface with touch controls that are generated by the end-user when using the D3 Mobile application 205. In other words, the input manager module 314 manages transitions in the application based on input events such as swipe and tap on the screen x amount of times. The Input Manager Module 314 works with and/or interfaces with the Logic Controller Module 253 in order to make transitions based on input events. For example, the Input Manager Module 314 keeps track of where a start position and an end position of an end user's touch was, which allows the D3 Mobile Application 205 to depict or display directions user touches or swipes are going. In addition, the Input Manager Module 314 may also keep track of which object or element is being touched with a raycast, a laser-like beam that will act as a trigger to an event once it hits a particular object. In some embodiments, raycasting may mean to shoot an invisible ray in a specified direction from a point to determine if there are any objects or items that lay in the path of the ray. Raycasting may be utilized for collision detection and an event may be programmed to execute when a generated ray hits or collides with the object or item. This component utilizes touch controls inside of the application.

The Logic Condition Module 253 may include the TouchNode Module 317. The Touch Node module 317 receives information from the Logic Condition Module 311. The Conditions Module xxx, the JSON Logic Node module 312 and/or the Logic Controller module 253 may utilize the Touch Node module 317. In these embodiments, the Touch Node module 317 may store data or parameters that are used for transitions inside the Logic Controller Module 253. In other words, the Touch Node module 317 may be a data component that helps transfer and hold data to manipulate the D3 Mobile Application 205. More specifically, the Touch Node module 317 may be used to help deserialize what type of touch or interaction should be detected with a touch logical condition (e.g., what type of touch event or interaction should be utilized to initiate a touch logical condition).

In some embodiments, the Logic Controller Module 253 utilizes the Condition Type Module or component 310 to iterate through a number of possible conditions. In some embodiments, the Condition Type module or enum 310 may help organize the story file and may also be used to differentiate between each logical node in order to be accurately parsed and/or transition. In some embodiments, the Condition Type module or enum 310 may prevent human error when attempting to access the different types of logic conditions.

The Logic Controller Module 253 includes Event Module 316. In some embodiments, the Event Module 316 or component may store and/or generate data and/or parameters that are being used as events. In these embodiments, the Event Module 316 may keep track of values for different events, which could include keeping track of progression values (how far along the event is), as well as whether certain conditions or thresholds have been met or not. More specifically, Event Module 316 may keep track of the progress of logic condition events and if the condition of that event has been met or not. The Events Module 316 or component may be a Unity MonoBehaviour script that can be attached to a GameObject within a scene.

The Logic Controller Module 253 also includes the Logic Condition Module 311. In some embodiments, the Logic-Condition Module 311 passes down or communicates a nextNodeId for each logic node and/or transition. The Logic Controller Module 253 or component only holds data and/or is used to be read as data or parameters. In some embodiments, once a logical condition is met, the Logic Condition Module 311 keeps track of a next node in a story file that the story file that is supposed to transition to once the logical condition is met.

The Logic Controller Module 253 includes the ProbabilityNode Module 315. The ProbabilityNode Module 315 may store data and/or parameters that are utilized to transition inside the Logic Controller Module 253. The ProbabilityNode Module 315 may be a data component that helps transfer and/or hold data or parameters to change or manipulate the D3 Mobile Application 205. In some embodiments, the ProbabilityNode Module may calculate values given cumulatively to 1 and maybe utilized to choose a random transition. In some embodiments, the Probability Node Module 315 may be used to deserialize a chance of a randomized node transition based on the story JSON parameter. In some embodiments, the ProbabilityNode Module 315 may inherit or receive information or parameters from the Logic Condition Module 311 and may be utilized by the Conditions Module xxx, the JSON Logic Node Module 312, and/or Logic Controller Module 253.

The Logic Controller Module 253 includes the SpeechNode Module 318. The SpeechNode Module 318 stores speech-related data or parameters that may be utilized to transition inside the Logic Controller Module 253 and/or utilized to hold and/or transfer data within the D3 Mobile Application 205. The SpeechNode Module 318 specifically interacts with IBM Watson, a third-party speech detection API, in order to make transitions in speech-related aspects of the D3 Mobile Application 205. In other words, the Speech Node Module 318 may be used to deserialize an array of phrases (e.g., speech data and/or parameters) that would be accepted for the speech input based off of the story JSON file.

The Logic Controller Module 253 includes the JSON-LogicNode Module 312. The JSONLogicNode module 312 may deserialize the story json file for the logic nodes section. The JSON Logic Node Module 312 may break down and/or separate the information, data and/or parameters into its own components that can later be manipulated and utilized to transition between scenes and other nodes of the JSON story file. In some embodiments, the JSON Logic Node module 312 may deserialize condition types using the Conditions or Condition Types Module 310, making it easier to have a multi-logical Logic Node, with multiple different types of logical conditions that could be checked at once. The JSON Logic Node Module 312 inherits from JSON Nodes, and is used in JSON Manager Module 251.

The Logic Controller Module 253 also includes the ExampleStreaming module 313. In some embodiments, the ExampleStreaming module may utilize an IBM Watson API in order to reproduce text to speech during a scene in a story file. In addition, the Example Streaming Module 313 may produce text with the speech that the user provides.

The Logic Controller Module 253 may include an Azure Authentication module 319. In some embodiments, the Azure Authentication module 319 may control the D3 Mobile Application 205's authentication process in order to utilize Microsoft's Azure services. The Azure Authentication module 319 may be partnered with the Azure TTS in order to achieve character interactions through speech. In some embodiments, the Azure Authentication may be utilized by the CharacterTTS module in order to translate text files into string files that the Azure text-to-speech can use. In order to utilize Microsoft Azure, authentication is needed, and the Azure Authentication module 319 provides this. The Azure Text to Speech module interacts with Microsoft Azure's API to be able to utilize the Microsoft Azure's Text To Speech features inside of the D3 Mobile application 205. The Azure TTS may utilize Microsoft Azure's API to change text strings into audio that can be played with Unity's AudioSource. In some embodiments, the Azure TTS may be a Unity MonoBehaviour script that can be attached to a GameObject within a scene of the story file.

The User Interface Module 254 includes a Menu Controls Module 360, a Story Search Module 361, a Story Controls Module 362 and/or a Story Settings Module 363. In some embodiments, the Menu Controls Module 360 controls and/or includes functionality that alters a main menu screen of the D3 User application 205. In some embodiments, this may include the RefreshMenu( ) function which refreshes displayed data in the Main Menu's UI. In some embodiments, the Menu Controls Module 360 communicates with the Main Menu Module 250 in order to refresh what is being displayed from the story files or a list of story files in the main menu of the D3 User Application 205. For example, the Menu Controls Module may control that if a user taps a reload button in the Main Menu, the main menu will reload utilizing the Menu Control Module 360 and now include and display new, stories (or story files) that were just added to the system and were not appearing in the main menu previously.

The Story Search Module 361 interacts and/or interfaces with the UI Module 254 inside of the D3 Mobile Application 205 and allows an end-user to search and filter through specific story listings (associated with story files) by the story names. The Story Search Module 361 communicates with the Main Menu module 250 in order to instruct or tell the Main Menu module 250 which story listings to display based on the end-user search in the D3 Mobile Application. In some embodiments, the Story Search Module 361 presents the search bar in the D3 Mobile Application 205 to allow end-users to find story (story files) easier.

The JSON Story Controls Module 362, when an end-user selects a story (story file), deserializes that story's json file and stores object-oriented versions of the nodes into the JSON Story Control Module 362. In other words, the JSON Story Control Module 362 is updated with all of the selected story files deserialized nodes. In some embodiments, the JSON Story Control Module 362 or script focuses on storing all node information and/or parameters after the selected story json file is completely parsed into a class system. By doing this, any of the nodes are easily accessible, along with the information and/or parameters stored inside any of the nodes. In some embodiments, the JSON Story Control Module 362 may keep track of each node within a story file. These nodes are the deserialized forms of the nodes that were created out of the story json file, and are converted, by the JSON Story Control Module 362, into an object oriented format.

The Story Settings module 363 allows the user to manipulate the position, rotation, and scale of the objects inside of the AR Environment. It can be accessed through UI components calling methods like ShowSettings, ExitSettings. From there, the slider values can be adjusted to the user's choice.

In some embodiments, the JSON Logic Node module, the Condition Module and/or the Logic Controller Module may utilize the EventNode module 316. In some embodiments, the EventNode Module 316 may store the data and/or parameters that are used to transition inside the Logic Controller Module 253. In other words, the Event Node Module 316 is a data component that helps transfer and hold data and/or parameters to manipulate the application. In some embodiments, the Event Node Module 316 may handle deserializing the logic event's type and/or desired progress from the story json file. In some embodiments, the Event Node Module 316 may interact with events from the Events Module that occur inside of the application such as completing a specific task in order to continue.

In some embodiments, the JSON Logic Node module 312, the JSON Manager Module 251 and/or the JSON Story module 324 may utilized the JSON Nodes module 320. This script holds the majority of the Node type classes, including the base class that each one of them inherits from. Each one of these classes are focused on parsing whatever information it can from the json, and any information that cannot be quickly translated into the class system is parsed through the constructor and any necessary nested classes. JSON Nodes is the base class for all nodes within a story. It helps deserialize consistent properties like the node id, node type, and so on. Whenever the type of node is being determined, JSON Nodes are always used first.

The Character Module 256 includes the Character Element module 330. The Character Element Module 330 includes a Text-to-Speech module 341, a Character TTS Module 342, a Chatbox Controller Module 343, an Animation Module 344, a Transform Module 345, and/or a Movement Module 346. The Movement Module 346 may include an Orientation Module 350, a Waypoint Module 351, and/or a Destination Module 352.

The Character Element Module 330 includes a list for each of the characters in the story files. The Character Element Module provides a list of elements for each of the characters (e.g., the character files include elements such as text-to-speech data or parameters), text-to-speech (TTS) data or parameters, and/or movement data or parameters. These are all components of the character. The Character Element Module 330 (and each character element or file) may be expandable to any feature or action the character would like to have. In other words, there is no limit as to features or actions that may be assigned to characters. The Character Element Module 330 may store animations, TTS and/or movement data or parameters by deserializing the story JSON file into an object oriented class system. In some embodiments, the end-user may experience the Character Element Module 330 by viewing or hearing the character's animations, speech or movement.

The Transform Module 345 may store data, parameters and/or values of the each 3D object available in the D3 Mobile Application 205. In some embodiments, the Transform Module or Component may store a position, rotation and/or scale for each of the 3D Objects. In some embodiments, the Transform Module or component 345 may assign these values, data and/or parameters when 3D objects are populated into a scene in the selected story file that includes characters and/or props. The Transform Module 345 may allows the D3 Mobile Application to store position, rotation, and scale in a form similar to Unity's GameObject Transform component by deserializing the json information in the selected story files into an object oriented class system.

The Animation Module 344 or component may store information, parameters or values on each animation file attached or assigned to an animatable object or character. The stored information, parameters o values may be deserialized by the Animation Player Module 257. The information, parameters or values stored in each animation file by the Animation Module 344 for the animatable object or character may include a name of the animation, an animation start time and end time, an animation assetbundle url, and/or a number of times an animation loops. In some embodiments, the Animation Module or component 344 may keep track of when an animation should start and end in relation to the rest of the story file by deserializing the json information from the selected story json file into an object oriented class system. The Animation Module or component 344 may also have a link to an asset bundle depending on whether the D3 Mobile Application is running on Android or iOS. In some embodiments, the end-user may see operation of the Animation Module or component 344 because it is deserializing the animation details from the selected json story file.

The Character TTS Module 342 interacts and communicates with the SceneController Module 252 and the Character Module 256 and may attach a prefab (a blueprint of the TTS feature) to an object that will allow it to converse. The Character TTS Module 342 may control when a character speaks by playing the voice selected by the creator that is attached to the character or prop. In some embodiments, the creator may assign parameters for what the characters should say and/or may also customize a time frame of when the character may speak the words. In some embodiments, the Character TTS Module 342 may cause a speech bubble to be displayed over a character's head containing the text of what the character is saying in the D3 Mobile Application 205. In some embodiments, the Character TTS Module may be a Unity MonoBehaviour script that attaches the code onto GameObjects. The main purpose of this component is to play audio using Unity's AudioSource using the audio generated from TTS. This component also utilizes Unity's prefab feature where the text to speech feature is added on top of the prop or character instead of it being built into the character.

The Movement Module 346 may be utilized by the Character Element Module 330, the Character Module 256 and/or the Scene Controller Module 252. In some embodiments, the Movement Module 346 may receive and/or take the deserialized data, parameters or values from the selected json story file that is specifically from a movement block of the selected json story file. The Movement Module 346 may utilize the deserialized data, parameters or values to manipulate the character or object's movement through DOTween. The Movement Module 346 is utilize to deserialize movement paths based on data, parameters or values received from the Orientation Module 350, the Waypoint Module and/or the Destination Module 352. The Movement Module 346 allows an end-user to see objects or characters move across a display screen in the D3 Mobile Application 205.

The EntityOrientation Module 350 may be utilized within the Movement Module 346 in order to keep track of where an object or character is supposed to be facing. In some embodiments, the EntityOrientation Module 350 may be utilized and/or partnered with DOTween in order to determine an orientation of a movement path the specific object or character looks towards. In some embodiments, the Entity Orientation Module 350 may deserialize the data, parameters or values on where the character or object is supposed to be looking or facing, and what object or character, the object or character is supposed to be looking at, if any. In the D3 Mobile Application, if an end-user sees objects or characters focusing on a particular object or area while moving, the EntityOrientation Module 350 may provide this functionality.

The Waypoint Module 351 may be utilized with the Movement Module 346 to keep track of where an object or character is supposed to transition or move to. The Waypoint Module 351 is a nested property of the Movement Module 346 and stores the parsed or extracted json data, parameters or values from the story json file for the specific waypoint the movement iterates to or moves to. In some embodiments, the parsed json data, parameters or values may include a point's ID and position, a starttime the object is supposed to begin moving there and an endtime when the object is supposed to reach there (in relation to the selected story file). In some embodiments, the Waypoint Module 351 may deserialize the waypoints an object or character is supposed to transition to during their movement.

The Destination Module 352 is utilized by the Animation Module 344 to utilize position, rotation and scale during the animations that occur during playing of the selected animation file. In some embodiments, the Destination Module 352 is a nested property of the Animation Module 344. In these embodiments, the Destination Module 352 stores the parsed story file JSON data, parameters and measurements for the position, rotation and/or scale for a destination where the GameObject is supposed to go to. In these embodiments, the Destination Module 352 also helps deserialize the story file json information, parameters and/or measurements into a more Unity friendly format by, for example, converting the position, rotation and/or scale values into Vector3s. The Destination Module 352 allows an end user utilizing the D3 Mobile Application 206 to see character animations being played.

The Session Status Manager is utilized by the JSON Manager Module 251. The JSON Manger Module 251 includes the JSON Nodes Module 320, the Node Element Module 321, the Debug Controller Module 322, the JSON Root Module 323, the Story Module 324, the Load Asset Bundles Module 325, the Story Data Module 326, the Universal Rules Module 327 and/or the User Module 328.

The JSON Logic Node module 253 and the JSON Manager Module 251 utilize the JSONNodes Module 320. The JSON Logic Node module 253 stores a majority of the Node type classes, including a base class that each of the Node type classes inherits from. Each of these classes or modules may be focused on parsing and/or extracting whatever information the class or module can from the story json file. In some embodiments, any information, data and/or parameters that can not be quickly translated and/or extracted into a class or module may be parsed through a constructor and/or any nested classes or modules. The JSON Nodes module 320 is the base class or module for all nodes within a story file. The JSON Nodes module 320 assists in deserializing consistent properties like the node id, node type and/or so on. In some embodiments, when a user selects a story file, the JSON Nodes module assists or helps in deserializing the story json file into object oriented versions of the nodes.

The DebugController Module 322 communicates and/or connects with the UI Module 254 and/or the Story Settings Module 363 in order to turn on and off. The DebugController Module 322 may also interact with the User Roles Module 328 in order to determine or identify who may utilize this functionality. The DebugController Module 322 may allow a developer to see logs in which events occur and may allow help finding bugs more easily with time. In some embodiments, the creator or producer may set a role to identify whether a user can access this menu or not. Thus, if a user is assigned a role that the user can see the debug controls, the user may be able to access developer debugger and events. The DebugController Module 322 may be a Unity Monobehaviour script that is attached to the Manager Gameobject. The DebugController Module 322 may toggle the Debug UI Canvas on and off when the user toggles the checkbox in the settings menu. The DebugController Module 322 may display any of the Unity Logs that naturally would be shown in the Editor Window, easily on the screen for testing on mobile. The DebugController Module 322 may also allow selection of what type of logs to show for easier reading and simplicity.

The JSON Nodes Module 320 may utilize the NodeElement Module 321 in order to deserialize extra elements within each node. The JSON Nodes Module 320 may be a property or attribute within JSONNode classes that includes and/or contains additional component information. In some embodiments, the current additional properties are a list of JCharacter, JProp and TwoDObject. The Node Element Module may deserialize more complex elements within each node, including characters, props and 2D objects. The Node Element Module 321 allows a character or proper to be visible in a story scene of a story file.

The JSONRoot Module 323 receives the deserialized data, parameters and/or measurements from the JSON Manager Module 251 and stores the deserialized data, parameters and/or measurements into the easily accessible object oriented class system. The JSONRoot Module 323 receives the deserialized data, parameters, and measurements from the story json file and then stores this data in relations to users, organizations, platforms and some settings. The JSON Root Module 323 may store data, parameters or measurements such as story file name, those individuals who are collaborating on the story file, which application the story file is running on and/or privileges that users or end-users should have for the story file. Thus, the end-user's role and organization privileges and restrictions are enabled or made possible by the JSON Root Module.

The JSON Story Module 324 may be updated with all of the story file's deserialized nodes. The JSON Story Module 325 may store all node information after the story json file is completely parsed or extracted into the class system. In some embodiments, the JSON Story Module 325 may allow for easy access to any of the nodes and/or whatever information, parameters and/or measurements are nested inside the nodes. The JSON Story Module 324 may keep track of all nodes of a story file. The JSON Story Module 324 nodes are deserialized forms of the nodes that were created or extracted from the story json file and converted into an object oriented format. In other words, the JSON Story Module 324 deserializes that story's json file and stores the object oriented versions of those nodes into JSON Story Module 324.

The StoryData Module 326 has all the information, parameters and measurements about the story that is loaded from the story json file and also has properties assigned by the Main Menu Module 250. The information, parameters and measurements stored in the StoryData Module 325 is later utilized by the JSON Manager Module 251 to deserialize the story file data, parameters or measurements. In other words, the StoryData Module 326 may be utilized to keep track of raw json data that will later deserialized when it is needed. The StoryData module 326 may store the story json data, parameters or measurements throughout all modules or components for each of assets. The StoryData module 326 may also include settings of the story file. In some embodiments, the end-user may update the story file Data or parameters when they select which stories they want to experience.

When a character element is deserialized from a story JSON file, the Scene Controller module 252 may call the LoadAssetBundle Module 325 to load the asset bundle containing a model of the character or prop. The LoadAssetBundle Module 325 may download specific assets from the one or more asset database based on the information obtained, parsed or extracted from the story file json. The LoadAssetBundle Module 325 may cache the object to be utilized in the D3 Mobile Application 205 and then may be removed upon exiting the D3 Mobile Application 205. The LoadAssetBundle Module 325 may then communicate and/or deliver the required models of the characters or props to the Scene Controller Module 252. The end user may see assets loaded into the story file in the D3 Mobile Application 205 due to the operation of the LoadAssetBundle Module 325.

The User Module 324 is a data container for the user's information, parameters or measurements. The User Module 324 may be utilized to filter story files based off of the role and/or organization of the user. In some embodiments, depending on the organization of the user, the User Module 324 may also store facial features of the user to detect what facial features are possible. The User Module 324 may be utilized to transition between logic conditions as well as to user usages within the D3 Mobile Application 205. The User Data is taken from the Firebase database by the JSON Manager Module 251. Due to the operation of the User Module 324, the end user notice may notice that their access to certain content is restricted.

Figure 4A:
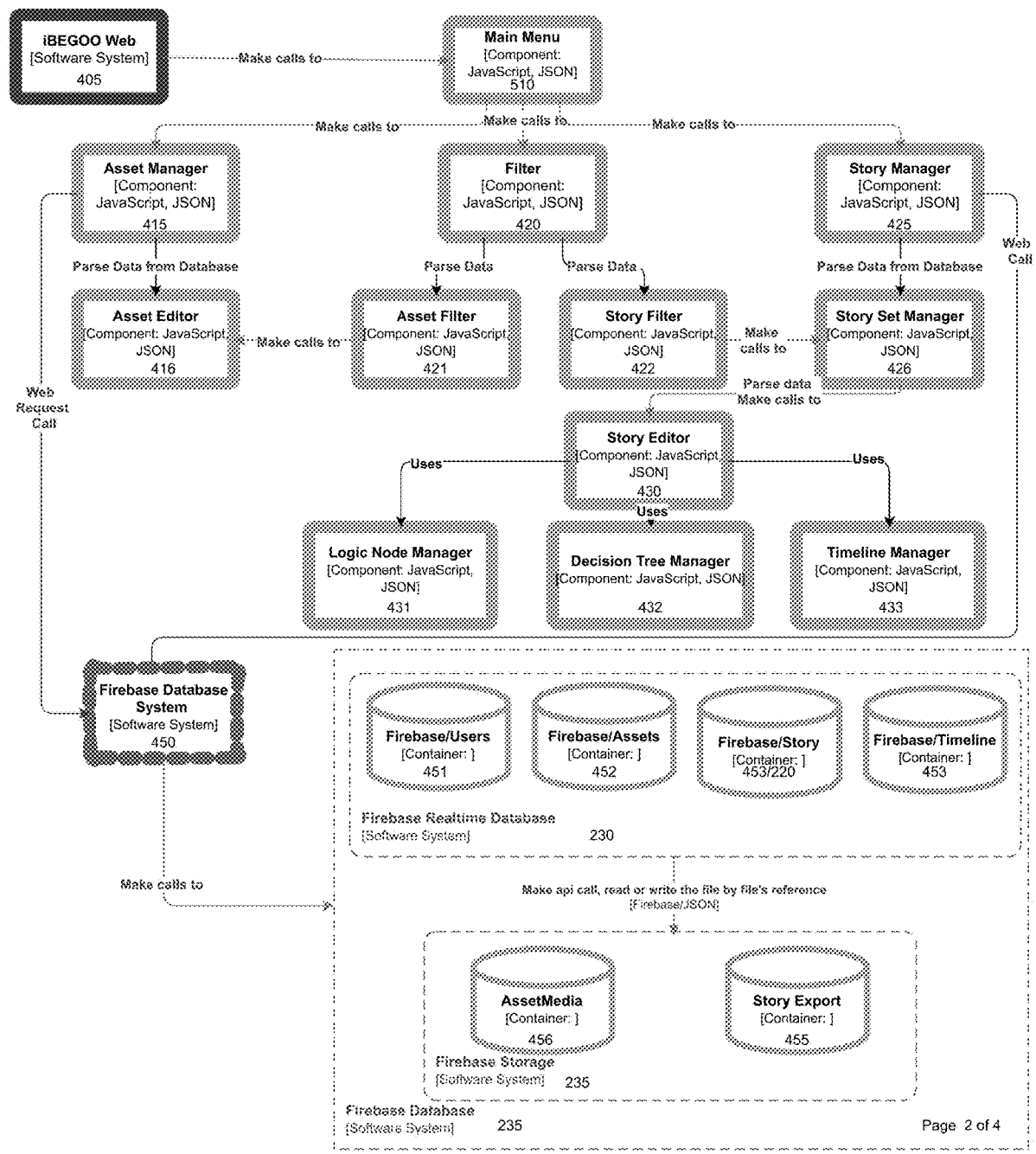
FIGS. 4A, 4B and 4C illustrate operation of the TB Web Application according to some embodiments.
Figure 4B:
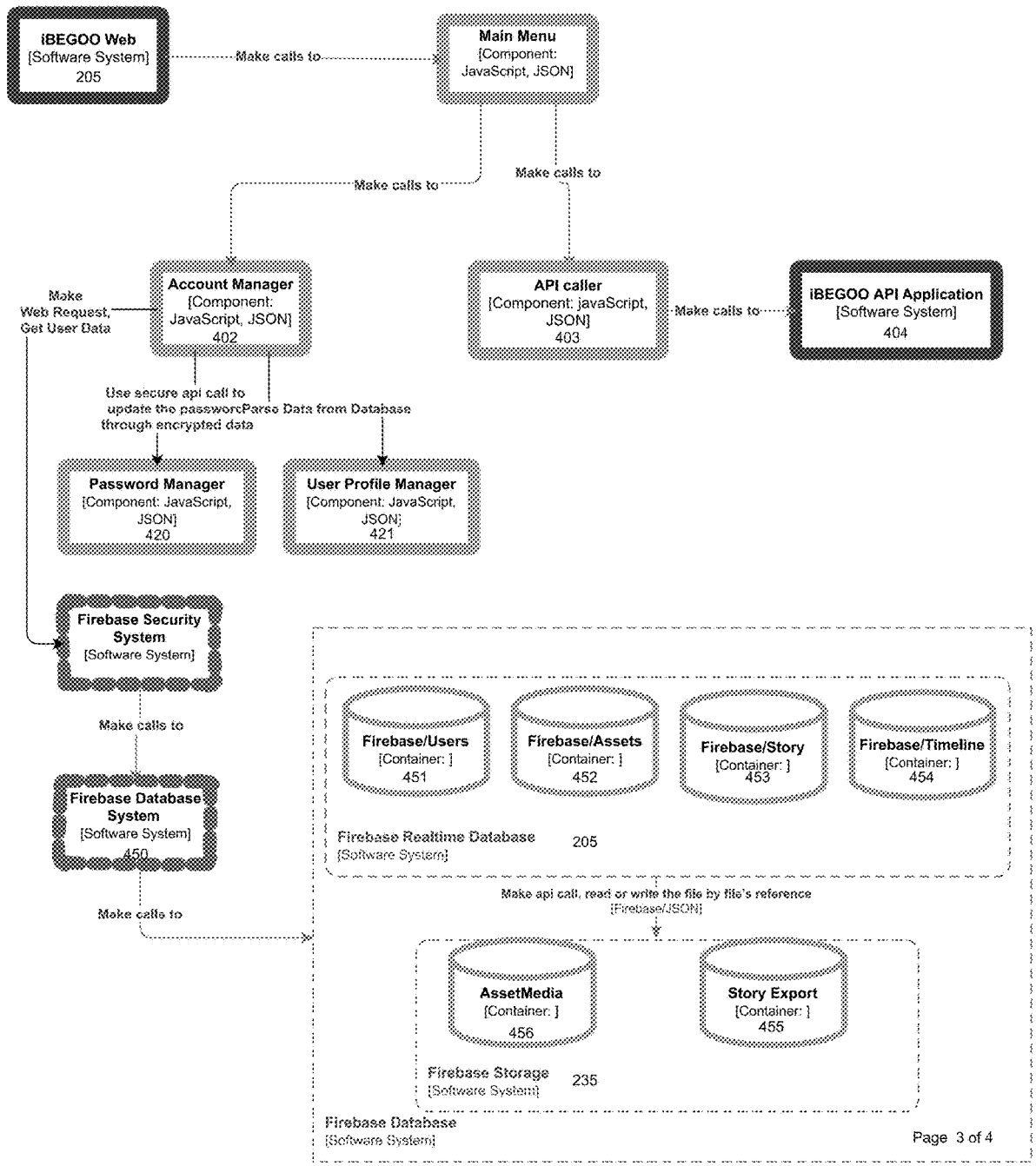
Figure 4C:
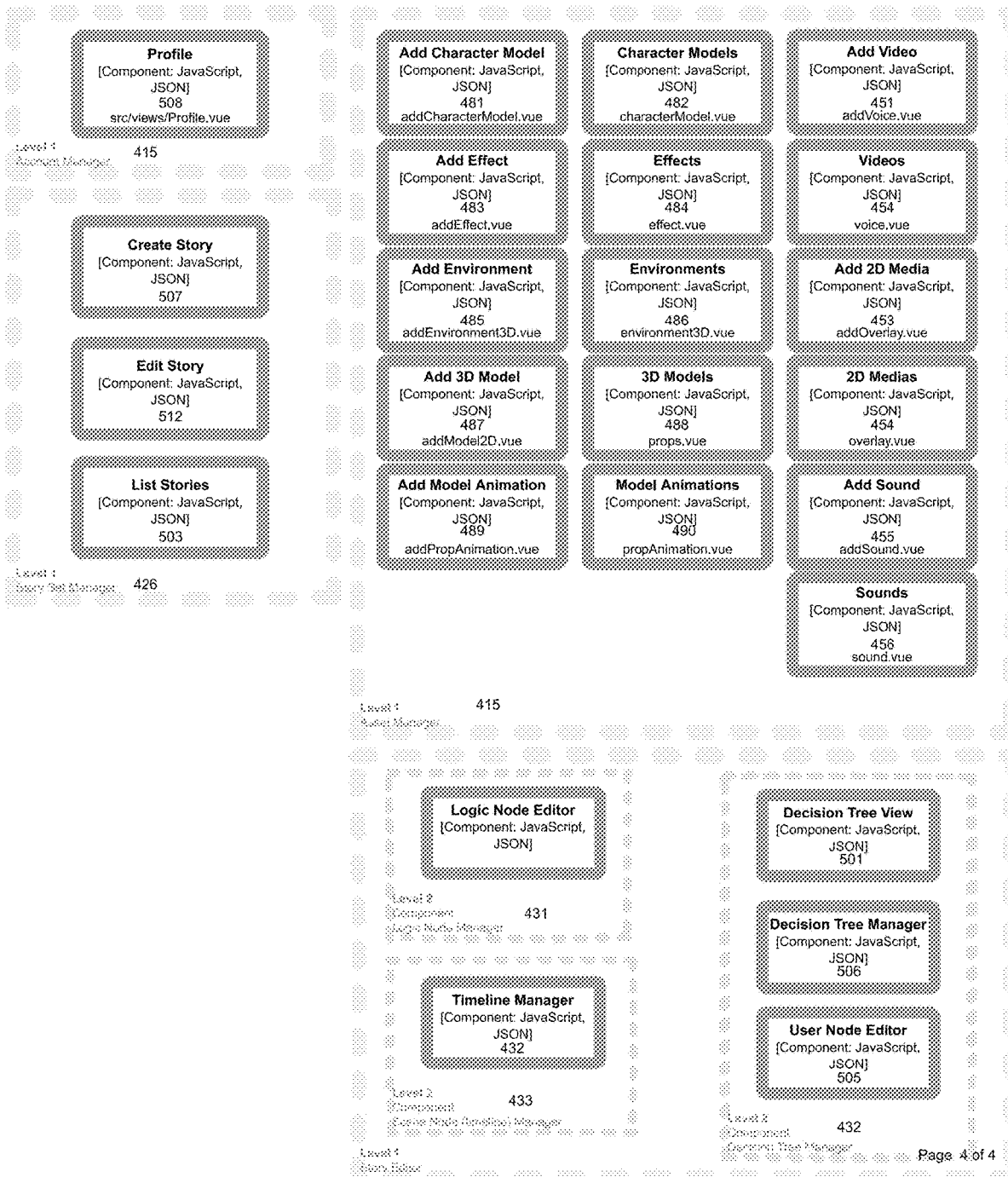

FIGS. 4A, 4B and 4C illustrate operation of the D3 Web Application according to some embodiments. The D3 Web Application 405 allows producers, consumers, and/or enterprises to create Augmented Reality story files that incorporate their story ideas. In some embodiments, the IB Web Application 405 is a platform for Prosumers/Consumers/Enterprises to create and design their own augmented reality (AR)/virtual reality (VR) story files and/or experiences using state-of-the-art features such as advanced filtering, 3D preview, and enhanced animations. The D3 Web Application 405 also includes a fully customizable story editor, and/or an asset management system 415. The D3 Web Application 405 provides a multi-user collaborative environment where multiple users (producers, consumers and/or enterprises) may edit and/or manage story files utilizing real-time feedback. Any story file created by the IB Web Application 405 may be stored in the one or more databases 450.

The Main Menu Module 410 of the D3 Web Application provides the consumers, producers and/or enterprises an initial screen to begin utilizing the D3 Web Application 405. The Main Menu Module 410 communicates with and/or makes calls to the Asset Manager Module 415, the Filter Module 420, the Story Manager Module 425, the Account Manager Module 402 and/or the API Caller 403.

The Account Manager Module 402 allows users or administrators of the D3 Web Application 405 to manage all account-related information that is affiliated with that user, which may be a prosumer, consumer, creator and/or member of an enterprise. This is different from the end-users who experience the game objects via the D3 Mobile Application 205. The Account Manager Module 402 may store and/or manage all user data in the D3 Web Application 405. In some embodiments, the user data and/or parameters may be divided into two parts: account information and user information. The account information may be managed by the password module 470 and/or the user information may be managed by the user profile module 471. In some embodiments, users may enter and/or interface with the account manager module 402 via the main menu module 410 and/or then may enter or interface with the password module 470 and/or the user profile module 471 through the account manager module. The Password Manager module 470 allows user's to safely update the password and/or reset the password, in some cases utilizing email. The User Profile Manager Module 471 may allow users to update personal information and/or parameters. In some embodiments, the user's profile and/or personal information may include the user's address, user's name, phone number and/or email address.

The Asset Manager Module 416 allows users to manage all assets in the D3 Web Application 405. In some embodiments, the Asset Manager Module 416 stores and manages all assets in the D3 Web application 405, which includes the asset files and/or the associated description information and/or parameters. In some embodiments, the users may enter and/or interface with the Asset Manager Module through the Main Menu module 410 and/or the users can utilize the Account Manager Module 415 to interface with and/or enter the Asset Editor Module 416.

The Asset Editor Module 416 allows users to upload, edit and delete asset files. The asset files may be stored in the Asset Editor Module 416 utilizing Firebase's application programming interface (api). In these embodiments, the asset files description information and/or parameters are stored in the asset realtime database 452 which is part of the Firebase Realtime Database 230. In some embodiments, the asset information and/or parameters may be upload request, upload time, file reference url and/or other relevant information. The Asset Editor Module 416 may be a subcomponent of the Asset Manager Module 415.

The Main Menu Module 410 also includes a Filter Module 420. The Filter Module may be utilized by users to filter story files and/or asset files according to the user's needs. The Filter Module 420 may provide a filtering function for asset files (e.g., asset information and/or parameters) (e.g., the Asset Filter Module 421) and/or story files (e.g., story information and/or parameters) (e.g., the Story Filter Module 430).

The Main Menu Module 410 also includes a Story Manager Module 425. The Story Manager Module 410 allows users or creators to create story files that can interact with the D3 Web Application 405. In some embodiments, the Story Manager Module 425 may allow users to create and manipulate story files. The Story Manager Module 425 may also allow the stores to be filtered through a searching system, where the searching system is based off of the organization or target.

The Story Manager Module 426 communicates with the Story Set Manager Module 426. The creator or user may utilize the Story Set Manager Module 426 to modify the story file information and/or to create a new story file. In some embodiments, the Story Set Manager Module 426 may communicate and/or interact with Firebase realtime Story database 453 (which is part of the Firebase Realtime Database module). In some embodiments, the Story Set Manager Module 426 may perform operations such as adding, deleting and/or updating story file information and/or parameters. The Story Set Manager Module 426 may be entered or accessed through the Story Manager Module 425.

The Story Editor Module 430 may allow a user to edit and customize the story file. This is a core system of the D3 Web Application Module 405. The Story Editor Module 430 may allow for editing of the entire story file information and parameters, which may include decision tree information and parameters, node information and parameters, and/or timeline information and parameters. In some embodiments, the Story Editor Module 430 may be accessed through the Story Set Manager Module 426.

The Logic Node Manager module 431 may allow users or creators to design or generate interactive logic flows through logic nodes and to generate new decision tree branches. The Logic Manager Module 431 is extremely complex and detailed because it includes parameters and/or information about all branches within a selected game object or story file. In some embodiments, the Logic Node Manager Module 431 may manage the data and/or parameters of all logic nodes, maintain different logic node information and parameters, and update the branches of the decision tree. In some embodiments, the users or creators may enter this component through the Story Set Component Module and/or the Story Editor Module 430.

The Decision Tree Manager 432 may be utilized by users or creators to access nodes in the story file and update the node information parameters. The Decision Tree Manager Module 432 may maintain a node array and a links array and may draw and/or generate a decision tree based on the nodes array and/or link array. Thus, the information and parameters stored in the Decision Tree Manager module reflects and/or represents the flow of the story file. In some embodiments, the user or creator accesses the Decision Tree Manager Module 432 through the Story Set Manager Module 426.

The Scene Node Timeline Manager Module may be utilized by the user or creator to construct a story file utilizing the assets from the Firebase Assets realtime database 452 (which is part of the Firebase Realtime Database 230). In some embodiments, the user or creator may utilize the Scene Node Timeline Manager Module 433 (which is a main content component) to update the scene node. In some embodiments, each scene node may have its own timeline, which reads one or more asset files from the Firebase Realtime Assets database 452 and allows a user or creator to define timeline content of the story file. These timeline content are utilized to present the story file with Augmented Reality Content to the end user in the D3 Mobile Application. In some embodiments, the user or creator accesses the Scene Node/Timeline Manager Module 432 through the Story Set Manager Module 426. This may also be referred to as the Logic Timeline Module. This new interface combines the logic tree and the timeline to allow the creator to drag and drop assets and also update the logic node and its condition. By clicking on the scene node, we can open the integrated timeline: that exactly shows the time that runs to get to this point in the story, it also shows how much time it has built in it. Expanding the scene shows a full window that helps the user have a better view of the project. Also by clicking on the logic node, we can open the integrated logic: that exactly shows the time that runs to get to this point in the story, it also shows all the conditions it has. Expanding the logic shows a full window that helps the user have better view of the of the conditions.

The API caller Module 403 may control access and/or linking to the D3 Application Server 404.

The D3 Web Module 405 stores the story information and parameters, the user information and parameters and/or asset information and parameters that are entered into the Firebase RealTime Database 230 by the user, creator and/or producer. In some embodiments, the RealTime Database 230 may include all of the user registered information and parameters including what the user's roles have access to, their story files, their activity data, access log files, and/or profile information and/or parameters like name, age and/or birthday. In some embodiments, the RealTime Database 230 may also keep track of Asset and Story data and parameters that may read or written to the Database Storage 235 (e.g., the Asset Media Database 456 and the Story Export Database 455) through application programming interface (API) calls.

In some embodiments, the user uploads the asset file or translates the story into a json file through the D3 Web application 405 and saves it into the Firebase Database Storage 235. In some embodiments, the Database Storage 235 contains all of the Asset File data that would be required to be loaded into the story file including audio files, asset bundles, image files, 3D models, videos and 2D models. The Database Storage 235 may also include the Story JSON file and all of the assets that are required for the story file and how each node interacts and references each other. In some embodiments, the users may read the asset file through the D3 Web Application 405 or read the story json file through the Unity Controller module 220.

The Firebase DataBase System 450 may include the Realtime Database 220, which includes Firebase Users database or container 451, the Firebase Assets database or container 452, the Firebase story database or container 453, and/or the Firebase timeline database or container 453. The Firebase Database System may also include the Firebase Data Storage 235 which includes the Asset Media Database or Container 456 and/or the Story Export Database or Container 455.

The Asset Manager Module 415 makes calls to Firebase Database System 450. The Asset Manager Module 415 includes a number of components. The Asset Manager Module 415 includes a number of Add Asset modules and/or Assets. As examples, the Add Character Model 481 allows Character Model files 482 to be added to story files; the Add Effect Modules 483 allows Effects files 484 to be added to story files; the Add Environment Module 485 allows Environments files 486 to be added to story files; the Add 3D Model Module 487 allows 3D Model files 488 to be added to story files; the Add Model Animation Module 489 allows Model Animations 490 to be added to story files; the Add Video Module 491 allows Videos to be added to story files; the Add 2D Media Module 491 allows 2D Media files 492 to be added to story files; the Add Sound Module 495 allows Sound files 496 to be added to story files.

The Decision Tree Manager 432 includes a Decision Tree View module 504, the Decision Tree Manager module 506, and/or a User Node Editor Module 505.

The Story Set Manger 426 includes a Create Story module 501, an Edit Story module 502, and/or a List Stories module 503. The Create Story Module 501 allows users, producers or creators to initiate creation of story files. The Edit Story module 502 allows users, producers or creators to edit and/or modify existing story files. The List Stories Module 503 allows users, producers or creators to view existing story files in the D3 Web Application Module 405.

As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

In some embodiments, the Logic module is one of the most significant features in iBEGOO creating systems (and/or software application). The Logic module provides a simple user interface for creating non-linear narrative in story files and creating versatile interactions (touch based, verbal based, motion/facial tracking) in story files without an individual having to know specific programming languages and/or engage in any coding process.

The Figures presented concurrently herewith illustrate the creation of the narrative and/or interactions in a story file. FIG. 5.1 illustrates that a creator can select from a number of logic types (e.g., touch, verbal, event, and/or probability). In step 551, the logic type for an interaction may be selected for the logic module. In some embodiments, step 551 may be referred to as Select Logic Type.

FIG. 5.2 illustrates conditions, experiences or parameters for an interaction according to some embodiments. In step 552, a creator may input and/or select the conditions, experiences or parameters into the logic module. This may be referred to as defining conditions and results for the logic. In some embodiments, a selected asset may be a content asset that the creator is going to utilize in for example an interaction for a scene in a story file. In some embodiments, for example, an experience for an interaction may be selected from options such as 2D and/or 3D. This may depend on a type of asset or content asset the creator is utilizing. Each of the types of logic interactions (e.g., touch, verbal, event, and/or probability may have different fields or parameters that may be selected). In some embodiments, since the logic type is touch, a creator may select a touch interaction type (e.g., tap/swipe and that a user may have tangible actions with a mobile computing device screen or display. In some embodiments, a creator may select an interaction decision (e.g., how a touch interaction may happen—such as swipe up/down/left/right, tap/double tap). In the embodiment illustrated in FIG. 5.2, the decision type is up, e.g., meaning the logic condition occurs when the swipe is in an upward direction. In some embodiments, the creator may also identify a path, e.g., when and/or where in the story file the condition and/or interaction may happen. In FIG. 5.2, the interaction with the defined logic type may occur in Scene2.

FIG. 5.3. illustrates a probability type event or interaction according to some embodiments. In some embodiments, this allows a selection of probability of an event type. The probability type allows a creator to determine what the probability is of a condition occurring and/or also what path, decision, result or scene may occur or be displayed as a result of that condition being selected. In some embodiments, as shown in FIG. 5.3, the creator may define a condition 1 as having a 50 percent probability of occurring and if condition 1 occurs, the software may cause the story file to branch or move to Scene 2 and the creator may create a condition 2 as having a 50 percent probability of occurring and if the condition occurs the software may cause the story file to move or advance to Scene 3.

Event type integrates scanning activity, motion capture, hand gesture, eyeball movement, etc. In some embodiments, a creator may utilize an event type in order to identify physical or movement cues that may allow transition within the story file. FIG. 5.4 illustrates different types of event types that may be created and/or selected by the creator according to some embodiments. For example, as illustrated in FIG. 5.4, an event may occur in response to a defined movement being completed, a lesson being completed, a defined hand gesture, a scan being completed and/or an eyeball movement. In the example illustrated in FIG. 5.4, when a scan is completed, the story file may move and/or branch to Scene 2.

FIG. 5.5 illustrates a feature of being able to apply multiple logic events, conditions and/or parameters to a single logic event according to some embodiments. In some embodiments, specifically with respect to touch logic types and event logic types, creators may apply multiple logics for one logic node. In some embodiments, step 553 may allow a creator to apply multiple logic events. In such embodiments, a priority may be utilized to differentiate the different logic types for the logic node.

FIG. 5.6 illustrates an edit logic node user interface screen according to some embodiments. In step 554, a creator may edit, delete and/or duplicate logic nodes. In some embodiments, this may allow a creator to easily make changes without having to code these changes and/or to duplicate logic nodes in order to reduce the amount of time it takes to create or establish a story file and the numerous logic nodes.

Node Tree Module or Component The information, parameters, content and/or logic in the D3 System may be stored in nodes. A logic tree is a structure that outlines or highlights the interrelationship or structure of the nodes in the story file. The Node Tree Module creates a logic tree that visualizes all nodes (scene, logic, user) and logic paths and maps out all components of a project file or a story file. In some embodiments, the creator utilizes the logic tree module to visualize a logic scale of the project file or story file and to manipulate, change or edit the logic tree structure of the project file or story file. In some embodiments, a creation of the logic tree structure may be illustrated below.

In step 561, the logic tree module may allow adding of one or more new nodes. FIG. 5.7 illustrates a user interface menu for adding a node according to some embodiments. In some embodiments, the new nodes may be added through tabs (e.g., an import tab). In some embodiments, the creator may create new scenes and/or logic when adding a new node.

In step 562, the logic tree module may allow a display of the logic tree structure. FIG. 5.8 illustrates a view of a logic tree structure for a project file or a story file according to some embodiments. In some embodiments, the nodes on the logic tree structure may be collapsible and/or expandable. In some embodiments, a creator may use the logic tree module to view the logic tree structure either as a whole and/or specific portions. In some embodiments, a scene node may be a regular node for augmented reality and/or two-dimensional scenes. In some embodiments, a logic node may be used for creating non-linear narrative and/or versatile interactions. In some embodiments, the user node may be an indicator or a representative for different paths of logic in the logic tree structure.

Toolbar—In some embodiments, the D3 System may utilize toolbars, a generalization of action bars that allow a creator to perform common operations within the system. In some embodiments, the Toolbar module may apply simple and clear icons to indicate a function, which saves a lot of space and enhances a space efficiency on the webpage. In some embodiments, a creator may utilize the Toolbar module may open a sitemap, add new project files, undo and/or redo a previous action, version control, filter, search, sort and/or change view layouts. FIG. 5.9 illustrates a toolbar according to some embodiments.

FIG. 5.10 illustrates a user interface for a Sitemap Module. In some embodiments, the sitemap module may generate and/or display a list of web pages of a web site within a domain. FIG. 5.11 illustrates an add feature and/or icon in a toolbar of the D3 software according to some embodiments. In some embodiments, a creator may add a new story file, a project file and/or a new application file. FIG. 5.12 illustrates an undo and/or redo feature or icon in a toolbar of the D3 software according to some embodiments. In some embodiments, a creator may undo and/or redo a prior action.

FIG. 5.13 illustrates a version control feature or icon in a toolbar of the D3 software according to some embodiments. In some embodiments, a creator may view prior versions of the story file, project file and/or application file.

FIG. 5.14 illustrates a filter feature or icon in a toolbar of the D3 software according to some embodiments. In some embodiments, the creator may utilize the filter function or module may allow creators to easily extract matching records or datasets from a larger set of source data or records based on input criteria. In some embodiments, the results of the filtering function or module may be dynamic. In some embodiments, the D3 software may provide advanced filtering and/or globally editing features and/or function across the whole D3 web site. In some embodiments, the creator may search application files, story files, project files and/or assets across the whole D3 system. In some embodiments, creators may set filtering criteria with a wide range of customization.

FIG. 5.15 illustrates a filtering category menu in the D3 software according to some embodiments. In some embodiments, a creator may filter and/or sort according to a city, an organization, an author, a creation date, a gender, a date, a gender, a color, a story, a scene and/or an experience. FIG. 5.16 illustrates a category menu in the D3 software according to some embodiments. In some embodiments, a creator may select different types of organizations or select a default, which may be all organizations (as different categories).

FIG. 5.17 illustrates a custom category menu of the D3 software according to some embodiments. In some embodiments, the custom category menu may allow selection of a customized or specific category value (e.g., such as selecting Columbia University of an education institution organization or category)

Live Collaboration and IB System. After story file and/or project file created, users may engage in a collaboration. Today, billions of people share photos through the use of digital services. Whether Flickr or Instagram, digital services allow for the sharing of photos on the Internet. As digital cameras become more advanced, users attain the power to create and discover new content. With the advent of augmented reality, AB Studio explores how photo sharing embodies a new form within our physical environments in the D3 System.

In some embodiments, Live collaborations may be an immersive platform allowing multiple users, in multiple locations, on multiple devices (YR computing devices, AR computing devices, desktop computing devices and mobile devices) to collaborate, communicate and learn subject matter together. This is a unique feature because the live collaboration module may remove the barrier of geography, reduce time spent traveling, reduce travel costs and speed up the process of learning and collaboration with students and/or teachers. In some embodiments, AB Studio and/or the IB System have developed a system that is a response to the changing world of work and learning where real-time collaboration and knowledge share empower and enhance performance.

FIG. 6.1 illustrates the D3 system including a video conferencing menu according to some embodiments. Video conferencing allows users in different locations to hold face-to-face meetings without having to be in a single location together. It is particularly convenient for users in different cities or even different countries to utilize the video conferencing module because the video conferring module may save time, expenses, and hassles associated with travel. Uses for video conferencing include holding routine meetings, remote learning, and/or interviewing of students by prospective employers. FIG. 6.2 illustrates a messaging function or menu in an D3 system according to some embodiments. In these embodiments, Collaborators (team members, students & teachers) can message each other through the messaging function inside the D3 system.

In some embodiments, a mixed-reality conference may be utilized to allow collaborators, colleagues, and students/teachers to interact with each other. With virtual reality, collaborators can go beyond existing communication technology like video and audio conferencing tools, to really interact face-to-face with colleagues, in order to bridge existing communication and collaboration gaps between participants. Meeting another person is one of the most amazing experiences you can have in Virtual or mixed reality conferences Reality. It is quite unlike communicating through any other medium except a real-life face-to-face conversation. Because the other person is life size, appears three-dimensional and shares a virtual space with you, body language works in a way that cannot be done on a flat screen.

FIG. 6.3 illustrates a first step in establishing an MR conference and the experience mode according to some embodiments. In some embodiments, the MR conference module may generate and display a number of characters that a user may select from. In addition, the MR conference module may generate and/or display an experience mode that a user may select from. These options may include augmented reality, virtual reality and/or 360 view. FIG. 6.4 illustrates options for selecting the experience.

FIG. 6.5 illustrates a virtual reality (VR mode) in the D3 system according to some embodiments. VR. mode accommodates participants in the same environment (e.g., a room, a classroom, an open area). In this embodiment, participants can hangout and meet together in the selected meeting environment. In some embodiments, the VR mode also includes a 360 mode, where the user does not require a YR headset. In these embodiments, the 113 system displays the YR scene by serving and/or displaying web pages of the VR scene in the meeting environment, FIG. 6.6 illustrates an augmented reality (AR) mode of a meeting or class in the 113 system according to some embodiments. In these embodiments, the AR. mode allows users to select a character to represent themselves during the meeting and/or may utilize the actual physical space they are in (e.g., by capturing and then integrating the captured image) or by selecting an environment where their character will be located. In other words, the meeting participants may customize their background with an image or scan their room environment when utilizing the AR mode. In the AR mode, when you speak or make moves, the MR module may cause your selected character to speak and/or move in the meeting, Beyond the exciting AR experience, the IB system's built-in artificial intelligence (AI) functionalities allows for responsive experiences that are tailored to each student's individual educational needs. Specifically, the ways in which students responded to the IB system content directly shaped the material to which they were exposed, thus creating an individualized learning experience responsive to each student's unique needs. The application collects data based on how well the students perform in each genre and/or story and stores their information inside of a database for the AI to be able to reference and cater to their specific needs based on the information saved. In some embodiments, this highly novel application of AI in an educational setting represents a significant shift towards new pedagogical tools and learning methods with considerable potential for future development. Further, these features could eventually be shared with the instructor reporting on aggregate- and individual-level outcome data, further enhancing individualized online learning experience.

Main Menu and Collapsible Windows—The D3 system also provides a unique and efficient user interface so that story creators and/or collaborators may see multiple different views and screens in order to more efficiently create the story file, class file and/or project file. FIG. 7.1 illustrates an initial layout of the main story page for the story file, project file or class file. In some embodiments, the main story page may include collapsible and/or draggable windows so that the creators and/or collaborators may easily map out the story file. The initial or main story page may include a site map, a scene mode, a toolbar screen, a timeline screen, a preview screen and/or an inspector screen, as is illustrated below.

FIG. 7.2 illustrates a collapsed Site Map (when the arrow is down). FIG. 7.3 illustrates an expanded Site Map. In some embodiments, the Arrow Signs are used to drop down the site map. These Collapsible arrows help creators and/or collaborators to bring down the site maps whenever they need. In some embodiments, the initial or main story screen includes icons for closing, minimizing and/or drag or dropping which is illustrated in FIG. 7.4 below. The X button allows creators and/or collaborators to close the Window. The "-" is utilized to minimize the window. The square may be used for dragging your window and/or dropping according to their preferred layout.

FIG. 7.5 illustrates preview, scene nodes, timeline buttons and/or inspector buttons in the main or initial screen menu. The 'Preview' button is for 3D display for the story. The 'Scene Node' button is used for the Dialogue Tree window. The 'Timeline button' brings in the Timeline with Info Bars in them. Lastly, the 'Inspector' button that brings out the Properties option for the story.

Inspector Module—The D3 System may also include an inspector Module. FIGS. 7.6, 7.7 and FIG. 7.8 illustrates an operation of an inspector module. You can select the cross button to close the inspector. To bring back the inspector module may click on or select the inspector logo.

In some embodiments, the D3 System may also allow the movable scene bars in the main menu display. In these embodiments, the creator or collaborator may utilize the bards to visualize more of the content of the story file or project file and/or adjust the screen ratio to the creator's needs. These movable bars help to adjust the screen ratio according to users' needs. It can help to visualize more on the screen with more screen space. FIGS. 7.9 and 7.10 illustrate movement of the movable bars to visualize more of the story file in additional screen space.

In some embodiments, the creator or collaborator may select different views when creating and/or editing a story, project or class file. FIG. 7.11 illustrates a creator selecting a timeline display or view for the story file according to some embodiments.

In some embodiments, the creator or collaborator may select a two view or multiple view layout. FIG. 7.12 illustrates a creator selecting a two view layout of the story file or project file including a logic node view and a scene view according to some embodiments. In some embodiments, the creator or collaborator may want to see a better view of the scene they selected. FIG. 7.13 illustrates a view of the created scene taking up most of the menu screen according to some embodiments.

Animation Module—FIG. 8.1 illustrates an animation module in the D3 system according to some embodiments. In some embodiments, the creator and/or collaborators may be able to select and/or identify details, parameters and/or features of a selected animation. In some embodiments, a creator may utilize the animation selector in the animation module to select an animation to be utilized in the story file. The creator may also utilize animation start to determine the duration of the selected animation. The creator may identify a number of loops or repetitions that the selected animation may be performed. The creator may also specific an animation rotation of origin (e.g., the original rotation of the character at an origin position); an animation position of origin (e.g., the original position of the character on the grid of origin); an animation rotation at the destination (e.g., the changed rotation of the character at the destination); and/or an animation position of destination (e.g., the changed position on the grip at the destination). In some embodiments, the creator or collaborator may also utilize the animation module to specify a rig or body for the selected animation (e.g., which may be humanoid, generic, and/or custom). The creator or collaborator may also be able to assign inverse kinematics to the selected character so that specific animations may be performed automatically. The creator or collaborator may also be to utilize the trim feature to cut down or shorten a length of the selected animation. The creator or collaborator may further be able to associate different animations with the selected animation and to blend transitions between the selected animation and the associated animations. In addition, the creator or collaborator may be able to utilize a stitch feature to sew together or stitch other animations with the selected animation in order to form a complete action.

Prop Module—FIG. 8.2 illustrates a prop module for selecting features, characters and/or parameters for props in the story file. The prop module allows creators or collaborators to select a prop for a story file. The creator or collaborator may be able to define an initial position and/or an initial rotation of a prop. The creator or collaborator may be also able to define a final position and/or a final rotation of the prop at the end position for the prop. In some embodiments, the creator or collaborator may be able to utilize a scale feature or function to resize the selected prop according to the environment where the prop is being utilized in the story file. The creator or collaborator may be able to utilize the rig feature in the animation module to attach a base skeleton or body to the selected prop that is to be animated. In some embodiments, the creator or collaborator may be able to utilize an interactive surface feature in the animation module to define and/or identify different parts of the selected prop that interacts with a character. In some embodiments, the creator or collaborator may be able to utilize a materials feature to select textures and/or skins that may be added and/or attached to the selected props.

Character Module—FIG. 8.3 illustrates a character module for selecting characters and associated parameters for a story or project file in an D3 system according to some embodiments. In some embodiments, a creator may, utilizing the character module, select a name of a character for the story, an initial position and/or an initial orientation of the selected character, and/or a destination position and/or a destination rotation of the selected character. The creator may, utilizing the character module, resize the selected character to be able to fit into and/or be integrated into the story file environment. In some embodiments, the creator may, utilizing the character module, select a base skeleton or body that may be attached or associated with the selected character, in order to allow the selected character to be animated. In order to make the selected characters move, the creator may, utilizing the character module, may identify joints in selected characters utilizing the interactive joint controller feature in order to interact with the selected joint of the selected character. In some embodiments, the creator may, utilizing the character module, may utilize the inverse kinematic feature to attach animation to the identified or selected joints of the selected character. Further, the creator may, utilizing the character module, select textures and/or skins that may be added to the characters.

Light Module—FIG. 8.4 illustrates a light module for assigning lighting values to story files in an D3 system according to some embodiments. In some embodiments, a creator or collaborator may, utilizing a light module, select a light or multiple light options in an environment that is part of a scene in a story file or project file. In some embodiments, the creator may, utilizing the light module, attach a specific prop to the selected light option (or options). The creator may, utilizing the light module, may select an intensity or brightness of the selected light option (or options) as well as to select shadowing effects for the selected light option (or options). The shadowing feature may help sharpen or soften the hardlines made by the light through rendering. In some embodiments, the creator may, utilizing the lighting module, specify a distance of how far the light intensity may travel or be projected in the story file. In some embodiments, the creator may, utilizing the lighting module, may select an initial position of the selected light option (or options) and/or an initial rotation of the selected light option (or options).

Audio Module—FIG. 8.5 illustrates an audio module for assigning sounds in a story file or project file according to some embodiments. In some embodiments, a creator or collaborator may select a sound or sound effect that may be utilized to portray actions. In some embodiments, the creator or collaborator may utilize an audio module to select background music for an environment of a story file or a project file. In some embodiments, the creator may utilize the audio module to identify if the selected sound plays or is reproduced linearly (e.g., in 2D) or played (or reproduced spatially (e.g., in 3D). In some embodiments, the creator may utilize the audio module to assign specific sounds to specific props. Further, in some embodiments, the creator may utilize the sound module to assign buttons or commands within the story file and/or project file to control the playing, pausing or volume of the selected audio files.

Inverse Kinematics Module—FIG. 8.6 illustrates an inverse kinematics module in an D3 system according to some embodiments. In some embodiments, the creator or collaborator may utilize the inverse kinematics module to select a time duration for the action and also to identify or select animations that work with kinematics. In some embodiments, the creator or collaborator may utilize the inverse kinematics module to position selected text on either a prop or on a blank surface. In some embodiments, the creator may utilize the inverse kinematics module to rotate the selected text in a specific place in the environment of the story file. In some embodiments, the creator may utilize the inverse kinematics module to select a position where the creator may end the text and/or a rotation or orientation where the text ends. In some embodiments, the creator may utilize the inverse kinematics module to select a place in a scene of a story file or project file where a user may input the text and/or a speed at which the input text will be played and/or displayed. In some embodiments, the creator may utilize the inverse kinematics module to select a color of the input text that is to be played or displayed. In some embodiments, the creator may utilize the inverse kinematics module to select props that are available to attach to a selected or identified animation. Further, in some embodiments, the creator may utilize the inverse kinematics module to select or identify a joint that is attached to the selected text for kinematics.

Media Module—FIG. 8.7 illustrates a media module according to some embodiments. In some embodiments, the creator or collaborator may utilize the media module to select a start time for the media file that is playing in the story or project file. In some embodiments, the creator may utilize the media module to select a type for media files (e.g., video, photos, gifs, etc.). In some embodiments, the creator may utilize the media module to select a placement of the selected media file in an environment of the story or project file. In some embodiments, the creator may utilize the media module to select an alignment (right, left or center) and/or scaling of the text. In some embodiments, the creator may utilize the media module to select props or characters that may be attached to the selected media files. In some embodiments, the creator may utilize the media module to blend multiple media files together in a story file or project file (e.g., the multiple media files may be multiple videos, gifs, and/or photos). In these embodiments, the creator may utilize the media module to select transitions between multiple videos, gifs and/or photos in a story or project files. In some embodiments, the creator may utilize the media module to allows users to have controls in playing the media file, where the users may utilize a start time, may mute the audio file, set the audio file to autoplay, may show player controls and/or may allow the user to make the selected media file play or be displayed in full screen.

Logic Treeline Module—In some embodiments, the D3 system may allow creators or collaborators to utilize a new feature called a logic treeline to more easily allow the dragging and/or dropping of assets and/or logic nodes and associated conditions for a story file, project file and/or class file. This may be referred to as a logic treeline module which combines the logic tree and the timeline in order to make things more efficient for the creator. FIG. 9.1 illustrates a logic treeline for a story file in the D3 system according to some embodiments. FIG. 9.1 illustrates a logic treeline with a number of scene nodes and/or logic nodes. Once a creator selects on a scene node (e.g., clicks on the scene node), the logic treeline module may open an integrated timeline. In some embodiments, the integrated timeline may show a time that the story file has to run to get to the selected scene node (e.g., how much time is built in. FIG. 9.2 illustrates an integrated timeline according to some embodiments. FIG. 9.2 illustrates when a creator selects scene 3 which when expanded shows that there is an unassigned node and also that there is a two-dimensional user interface.

In some embodiments, if the creator expands Scene 3, the logic treeline module may generate a better view of the scene in the story file by expanding the selected scene. FIG. 9.3 illustrates a better view by expanding the selected screen. Once a creator selects on a logic node (e.g., clicks on the logic node), the logic treeline module may show the different conditions that are available with the logic node.

FIG. 9.4 illustrates when a creator selects logic node 1 which when expanded shows the conditions, parameters and/or paths when the different conditions are selected. FIG. 9.5 shows the expanded view.

Please note that the AB software and/or the D3 software may allow creators to create the animation files that correspond to virtual reality, augmented reality, extended reality or mixed reality stories, software and/or files. Although a JSON file is mentioned, one or more JSON files may be utilized by the subject matter of the invention. The subject matter described herein is computer-readable instructions stored in one or more memory devices of a computing device, where the computer-readable instructions are executable or executed by one or more processors to complete the actions described above or below. The subject matter described herein provides a visual drag-and-drop graphical user interface that allows non-programmers (who don't know how to code software) to select a large number of characteristics or features of a virtual reality, augmented reality, extended reality or mixed reality story and create an animation or story file for the virtual reality, augmented reality, extended reality or mixed reality story. This results in significant ease-of-use for creators and/or companies who are generating and/or producing virtual reality, augmented reality, extended reality or mixed reality applications and/or software. In other words, the creators don't have to know how to program. This is a significant improvement over what is available in the marketplace today. The creators or non-programmers rely on the software and computer-readable instructions described above and below herein, to generate a Javascript Object Notation (JSON) file (or one or more JSON files) which includes all of the selected characteristics and/or features of the created virtual reality, augmented reality, extended reality or mixed reality software, program, story or file. This JSON file corresponding to the created virtual reality, augmented reality, extended reality or mixed reality story, program or file is then stored in a database either on the computing device where the story is created and/or in other computing devices. Utilizing this software and/or system described herein, the creator can identify and/or create thousands, hundreds of thousands or millions of characteristics and/or features for the virtual reality, augmented reality, extended reality or mixed reality story, software and/or file and store them in the database for later retrieval.

Once the virtual reality, augmented reality, extended reality or mixed reality story, software and/or file has been created, a user wanting to play or experience the virtual reality, augmented reality, extended reality or mixed reality story, software, application and/or file, may login to the AR/VR/ER or mixed reality software from a mobile computing device or desktop computing device. Upon logging in, a unity controller may retrieve the stored JSON file (or the one or more JSON files) corresponding to the virtual reality, augmented reality, extended reality or mixed reality story, software and/or file from the database. The JSON file may be parsed by the Unity Controller in order to determine the features and/or characteristics of the virtual reality, augmented reality, extended reality or mixed reality story, software and/or file as well as to determine what additional resources (e.g., media files, gif files, text files, software programs, etc.) may need to be retrieved in order to play and/or experience the virtual reality, augmented reality, extended reality or mixed reality story, software and/or file. In some embodiments, the Unity Controller (or other similar processor or controller) may retrieve the additional resources identified in the JSON file (or one or more JSON files) and then may present or play all of the retrieved information on the user's computing device so that the user can experience the virtual reality, augmented reality, extended reality or mixed reality story, application, software and/or file.

In some embodiments, a method of creating an animation file for a virtual reality, augmented reality, extended reality or mixed reality story file on a computing device, includes selecting an animation start to be utilized in the animation file to identify a duration of the animation file; selecting a number of loops or repetitions to be performed for the animation file; selecting a rotation at origin for the animation file; selecting a position of origin for the animation file; selecting a rotation at destination for the animation file; selecting a position of destination for the animation file; selecting a body type for the animation file; generating javascript object notation (JSON) parameters for animation file based at least in part on the selected animation start, the selected number of loops or repetition, the rotation at origin; the position at origin; the position of destination; the rotation at destination or the selected body type for the animation file; and storing the generated JSON parameters for the animation file in a database. In some embodiments, the generating of the JSON parameters further includes selecting or assigning an inverse kinematics motion corresponding to the animation file that is automatically performed. In some embodiments, the generating of the JSON parameters further includes trimming the duration of the animation file. In some embodiments, the generating of the JSON parameters further includes associating an additional animation file with the animation; and assigning a transition between the animation file and the additional animation file to blend the animation file to the additional animation file.

In some embodiments, the generating of the JSON parameters further includes associating an additional animation file with the animation file; and performing stitching of the animation file with the additional animation file. In some embodiments, the generating of the JSON parameters further includes selecting a prop for the animation file, the prop being an object to be utilized in the animation file; and selecting an initial position and an initial rotation of the selected prop. In some embodiments, the generating of the JSON parameters further includes selecting a final position of the selected prop and the final rotation of the selected prop; and selecting a scale function to resize the selected prop to correspond to an environment where the selected prop is being utilized. In some embodiments, the generating of the JSON parameters further includes utilizing a rig module to attach a body to the selected prop; and utilizing an interactive surface module to define or identify different parts of the selected prop to interact with a character in the animation file. In some embodiments, the generating of the JSON parameters further includes utilizing a materials module to select textures or skins for the selected prop. In some embodiments, the generating of the JSON parameters further includes selecting a character and associated parameters to be associated with the animation file, wherein the associated parameters including selecting a character name, an initial position of the selected character, an initial orientation of the selected character, a destination position of the selected character; and a destination orientation of the selected character.

In some embodiments, the generating of the JSON parameters further includes utilizing a character module, resizing the selected character to fit into and integrate into the animation file. In some embodiments, the generating of the JSON parameters further includes selecting a base skeleton or character body to be attached to the selected character; identifying joints in the selected character to allow the selected character to move in a display of the animation file; and utilizing a joint controller to interact with the identified joint of the selected character. In some embodiments, the generating of the JSON parameters further includes utilizing an inverse kinematic module to attach animation movement to the identified joint of the selected character; and selecting a skin or texture to be added to the selected character. In some embodiments, the generating of the JSON parameters further includes selecting a light option in an environment that is part of a scene in the animation file. In some embodiments, the generating of the JSON parameters further comprising attaching a specific pop to the selected light option. In some embodiments, the generating of the JSON parameters further includes selecting an intensity or brightness of the selected light option; selecting a shadowing effect for the selected light option; sharpening or softening hardlines made by the selected light option through rendering; or specifying a distance of how far a light intensity may travel for the selected light option.

In some embodiments, the generating of the JSON parameters further includes assigning sounds to an animation file; and reproducing the assigned sounds for the animation file. In some embodiments, the generating of the JSON parameters further includes assigning a media file to an animation file; and selecting a type of media file to be utilized in the animation file. In some embodiments, the creator may utilize a logic treeline module to allow for dragging and dropping of assets and logic nodes and associated conditions for the animation file.

In some embodiments, a method of playing an animation file to create a virtual, mixed, extended or augmented reality experience on a mobile computing device includes retrieving an animation file from a database, the animation file comprising a plurality of javascript object notation (JSON) parameters and the database located on a separate computing device from the mobile computing device; parsing the plurality of the JSON parameters to determine actions for a unity controller to take and files for the unity controller to retrieve; retrieving, by the unity controller, the files referenced in the parsed plurality of JSON parameters; and executing, by the unity controller or processor, the actions referenced in the parsed plurality of JSON parameters in order to generate the virtual, mixed, extended or augmented reality experience on a display or screen of the mobile computing device The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising."

The processor as disclosed herein can be configured with instructions to perform any one or more steps of any method as disclosed herein.

As used herein, the term "or" is used inclusively to refer to items in the alternative and in combination.

As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

The invention claimed is:

1. A method of playing an animation file to create a virtual, mixed, extended or augmented reality experience on a mobile computing device comprising:
    retrieving an animation file from a database, the animation file comprising a plurality of javascript object notation (JSON) parameters and the database located on a separate computing device from the mobile computing device;
    parsing the plurality of the JSON parameters to determine actions for a unity controller to take and files for the unity controller to retrieve;
    retrieving, by the unity controller, the files referenced in the parsed plurality of JSON parameters, wherein a JSON Nodes module assists or helps in deserializing the animation file into object oriented versions of JSON nodes and dividing the deserialized information into three classes, the Master Node datafile, the Scene Node datafile, and the Logic Node datafile; and
    executing, by the unity controller or processor, the actions referenced in the parsed plurality of JSON parameters in the Master Node datafile, the Scene Node datafile and the Logic Node datafile in order to generate the virtual, mixed, extended or augmented reality experience on a display or screen of the mobile computing device.

2. The method of playing the animation file of claim 1, the JSON parameters including inverse kinematics motion parameters.

3. The method of playing the animation file of claim 1, the JSON parameters
    including an additional animation file parameter and
    an assigned transition parameter to blend the animation file to the additional animation file.

4. The method of playing the animation file of claim 3, the playing of the animation file further including
    performing stitching of the animation file with the additional animation file.

5. The method of playing the animation file of claim 1, the JSON parameters including
    a prop,
    an initial position of the prop and an initial rotation of the prop.

6. The method of playing the animation file of claim 5, the JSON parameters further including
    a final position of the prop and a final rotation of the prop; and
    a scale function to resize the prop to correspond to an environment where the prop is being utilized.

7. The method of playing the animation file of claim 6, the JSON parameters including
- a rig module to attach a body to the prop; and
- an interactive surface module to define or identify different parts of the prop to interact with a character.

8. The method of playing the animation file of claim 6, the JSON parameters including
- a materials module to select textures or skins for the prop.

9. The method of playing the animation file of claim 6, the JSON parameters further including
- a character, a character name, an initial position of the character, an initial orientation of the character, a destination position of the character; and a destination orientation of the character.

10. The method of playing the animation file of claim 9, the JSON parameters including
- a base skeleton or character body to be attached to the character; and identifying joints in the character to allow the character to move in a display of the animation file.

11. The method of playing the animation file of claim 10, the JSON parameters including
- attaching animation movement to the identified joint of the character; and
- a skin or texture to be added to the character.

12. The method of playing the animation file of claim 9, the JSON parameters further including
- utilizing a character module in resizing the character to fit into and integrate into the animation file.

13. The method of playing the animation file of claim 1, the JSON parameters including a light option in an environment that is part of a scene.

14. The method of playing the animation file of claim 13, the JSON parameters further including a specific pop to the light option.

15. The method of playing the animation file of claim 14, the JSON parameters including a brightness,
- a shadowing effect, and a distance of how far a light intensity may travel for the light option.

16. The method of playing the animation file of claim 1, wherein the JSON parameters include assigned sounds.

17. The method of playing the animation file of claim 1, wherein the JSON parameters include a type of media file.

18. The method of playing an animation file of claim 1, wherein the Master Node datafile is utilized to coordinate operation of the Scene Node datafile and the Logic Node datafile.

19. The method of playing an animation file of claim 1, wherein the Master node datafile includes a parent node that includes several child nodes and the several child nodes may include Scene nodes and/or Logic nodes.

20. The method of playing an animation file of claim 1, further including a Logic Controller module, wherein the Logic Controller modules receives the Logic Node datafile and deserializes the Logic Node datafile to start different coroutines depending on a logic type of a node.

21. The method of playing an animation file of claim 1, further including a Scene Controller module, wherein the Scene Controller module receives the Scene Node datafile from a JSON Manager module and spawns and/or generates game objects and assigns the game objects components based at least in part on the Scene Node datafile.

\* \* \* \* \*